(12) United States Patent
Yoo et al.

(10) Patent No.: US 11,853,421 B2
(45) Date of Patent: Dec. 26, 2023

(54) METHOD AND APPARATUS FOR ANALYZING MALICIOUS CODE

(71) Applicant: AGENCY FOR DEFENSE DEVELOPMENT, Daejeon (KR)

(72) Inventors: Chan Gon Yoo, Daejeon (KR); Dong Ju Kim, Daejeon (KR); Ji Hae Ahn, Daejeon (KR); Jung Ho Lim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 586 days.

(21) Appl. No.: 17/037,691

(22) Filed: Sep. 30, 2020

(65) Prior Publication Data

US 2021/0264029 A1 Aug. 26, 2021

(30) Foreign Application Priority Data

Feb. 25, 2020 (KR) .......................... 10-2020-0023013
Feb. 28, 2020 (KR) .......................... 10-2020-0025535

(51) Int. Cl.
*G06F 21/00* (2013.01)
*G06F 21/56* (2013.01)
(Continued)

(52) U.S. Cl.
CPC ............ *G06F 21/563* (2013.01); *G06F 8/427* (2013.01); *G06F 8/433* (2013.01); *G06F 16/285* (2019.01);
(Continued)

(58) Field of Classification Search
CPC .. G06F 21/563; G06F 16/285; G06F 16/9024; G06F 8/427; G06F 8/433
See application file for complete search history.

(56) References Cited

U.S. PATENT DOCUMENTS 10,007,789 B2   6/2018   Kim et al.
2009/0282485 A1*  11/2009   Bennett .................... G06F 21/51
                                                     707/999.003
(Continued)

FOREIGN PATENT DOCUMENTS

KR         10-1512462       4/2015
KR      10-2016-0046640     4/2016
(Continued)

OTHER PUBLICATIONS

Office Action dated Jun. 15, 2021 for Korean Patent Application No. 10-2020-0023013 and its English translation by Google Translate.
(Continued)

*Primary Examiner* — Jeffrey C Pwu
*Assistant Examiner* — Thong P Truong
(74) *Attorney, Agent, or Firm* — Ladas & Parry, LLP

(57) ABSTRACT

Provided are a method and an apparatus for analyzing a malicious code by accurately and rapidly analyzing source code extracted from a set of a plurality of malicious codes, calculating a first degree of complexity of each of a plurality of malicious code binaries, select a root binary initially generated, by using the calculated first degree of complexity, and inferring an evolutionary order of the plurality of malicious code binaries, except for the root binary, based on the calculated first degree of complexity and a degree of distance between the plurality of malicious code binaries.

26 Claims, 16 Drawing Sheets

(51) Int. Cl.
  *G06F 16/901* (2019.01)
  *G06F 8/41* (2018.01)
  *G06F 16/28* (2019.01)
(52) U.S. Cl.
  CPC .... *G06F 16/9024* (2019.01); *G06F 2221/033* (2013.01)

(56) References Cited

U.S. PATENT DOCUMENTS

2015/0180883 A1* 6/2015 Aktas .................... G06F 21/564
                                                  726/23
2016/0110543 A1    4/2016 Park et al.

FOREIGN PATENT DOCUMENTS

| KR | 10-2017-0108330 | 9/2017 |
| KR | 10-1880796 | 8/2018 |
| KR | 10-1930293 | 12/2018 |
| KR | 10-2045500 | 11/2019 |
| KR | 10-2045772 | 11/2019 |

OTHER PUBLICATIONS

Office Action dated Jun. 21, 2021 for Korean Patent Application No. 10-2020-0025535 and its English translation by Google Translate.

Jiyong Jang et al.: "Towards Automatic Software Lineage Inference", This paper is included in the Proceedings of the $22^{nd}$ USENIX Security Symposium. Aug. 14-16, 2013, Washington, D.C., USA.

Vijay Naidu et al.: "Needleman-Wunsch and Smith-Waterman Algorithms for Identifying Viral Polymorphic Malware Variants", 2016 IEEE $14^{th}$ Intl Conference on Dependable, Autonomic and Secure Computing, $14^{th}$ Intl Conf on Pervasive Intelligence and Computing, $2^{nd}$ Intl Conf on Big Data Intelligence and Computing and Cyber Science and Technology Congress.

Annamalai Narayanan et al.: "A Multi-view Context-aware Approach to Android Malware Detection and Malicious Code Localization", arXiv: 1704.01759v2 [cs.CR] Apr. 8, 2017.

Fabian Yamaguchi et al.: "Modeling and Discovering Vulnerabilities with Code Property Graphs", 2014 IEEE Symposium on Security and Privacy, Nov. 2014.

* cited by examiner

METHOD AND APPARATUS FOR ANALYZING MALICIOUS CODE

CROSS-REFERENCE TO RELATED APPLICATION

This application claims the benefit of Korean Patent Application Nos. 10-2020-0023013, filed on Feb. 25, 2020, in the Korean Intellectual Property Office, and 10-2020-0025535, filed on Feb. 28, 2020, in the Korean Intellectual Property Office, the disclosures of which are incorporated herein in their entirety by reference.

BACKGROUND

1. Field

One or more embodiments relate to a method and an apparatus for analyzing a malicious code.

2. Description of Related Art

Malicious codes generated with malicious purposes may severely damage systems and system users. While studies into various methods of detecting malicious codes have been conducted, authors of malicious codes have also continually generated new malicious codes with reinforced functions to bypass algorithms for detecting malicious codes. The number of newly appearing malicious codes has exponentially increased, thereby making analysis thereof more difficult.

Malicious codes that have newly appeared are not completely new, compared with previous malicious codes. They are frequently generated by correcting or adding functions based on the previous malicious codes. For effective analysis of the growing number of malicious codes, data-dependency graphs, a syntax-aware malicious code detection, etc. may be used to detect and classify malicious codes. Also, upgrades of malicious codes may be viewed from the aspect of organic evolution, and thus, an evolutionary relationship diagram of the malicious codes may be established to compare new malicious codes with previously analyzed malicious codes, which may help perform an accurate and fast analysis.

According to the conventional art, in order to extract a data-dependency graph from malicious codes, dynamic analysis is mainly used. However, the dynamic analysis is less capable of comprehensively covering an execution range of malicious codes and takes more resources and time, compared to static analysis. Moreover, an algorithm that automatically infers the evolutionary relationship of the malicious codes based on the size and complexity of programs based on software evolution principles has been developed. However, inaccurate results may be derived from inference with respect to release-built binary and from inference with respect to root binary. That is because, when release-built binary is built, even if the size of an actual code is large, the capacity of the binary is not shown to be large. Also, a system to infer an evolutionary relationship after designing an artificial intelligence model by using creation time information has been introduced. There is a limitation in that the accurate inference of the evolutionary relationship is difficult with respect to a malicious code for which creation time information is not adequately provided.

In previous studies, a method was proposed to classify and dynamically execute families of malicious codes by using previous tools to obtain execution logs, and then, an evolutionary relationship is analyzed with respect to packed malicious codes through an unpacking process. Also, binaries themselves are not used as an input. Rather, based on a unit of a function of each program, as there are more identically-called functions, a higher degree of similarity for the functions is determined. Also, based on the degree of similarity of the functions, the evolutionary relationship is inferred and a graph is generated. There are limitations in that a previous binary code may be changed when an unpacker is used and the evolutionary relationship may not be normally inferred when the functions are not aptly identified.

In order to analyze mutant malicious codes generated in real time to the extent that new malicious codes are generated daily, it is highly important to analyze malicious codes by using a data-dependency graph and study how malicious codes have mutated. In addition, limitations increase for analysts to passively analyze a large number of malicious codes newly discovered in an actual cyber environment one by one.

Thus, in order to effectively analyze the exponentially increasing malicious codes, it is needed to increase the accuracy and speed of analysis, and also technologies for automating analysis of malicious codes and swiftly coping with new malicious codes are required.

PRIOR ART DOCUMENTS

Patent Documents (Patent Document 0001) KR 10-2045500
(Patent Document 0002) KR 10-2045772
(Patent Document 0003) KR 10-1880796
(Patent Document 0004) KR 10-1512462

SUMMARY

One or more embodiments include a method and an apparatus for analyzing a malicious code. One or more embodiments include a recording medium having recorded thereon a program for executing the method described above on a computer. Technical problems to be solved by embodiments are not limited to the matters described above. Other technical tasks may be inferred from the embodiments described hereinafter.

Additional aspects will be set forth in part in the description which follows and, in part, will be apparent from the description, or may be learned by practice of the presented embodiments of the disclosure.

According to one or more embodiments, a method of generating representative graphs for analyzing a function of a malicious code includes: obtaining a source code from a pre-stored malicious file; generating, by analyzing the source code, a first graph in which each of nodes is formed of a portion of the source code; analyzing a dependency relationship between parameters by analyzing the nodes of the first graph; generating second graphs indicating the analyzed dependency relationship between the parameters; clustering the second graphs based on a degree of similarity; and generating the representative graphs representing functions of each of clusters of the clustered second graphs.

The first graph may be a control flow graph (CFG), in which a basic block is formed by analyzing an abstract syntax tree, after the abstract syntax tree is generated by parsing the source code, the parameters may be application programming interface (API) parameters, and the second graphs may be API dependency graphs (ADGs) indicating a dependency relationship between the API parameters.

The method may further include storing the representative graphs and generating a database (DB).

The generating of the representative graphs may include generating the representative graphs by connecting only nodes having an appearance frequency exceeding a threshold value by adding each second graph.

The clustering of the second graphs may include using a K-means clustering method.

According to one or more embodiments, a method of analyzing a function of a malicious code includes: obtaining a source code of a malicious file which is an object of analysis; generating, by analyzing the source code, a first graph in which each of nodes is formed of a portion of the source code; analyzing a dependency relationship between parameters by analyzing the nodes of the first graph; generating second graphs indicating the analyzed dependency relationship between the parameters; and analyzing the function of the malicious code by comparing a degree of similarity between each of pre-stored representative graphs and the generated second graphs.

The first graph may be a control flow graph (CFG), in which a basic block is formed by analyzing an abstract syntax tree, after the abstract syntax tree is generated by parsing the source code, the parameters may be application programming interface (API) parameters, and the second graphs may be API dependency graphs (ADGs) indicating a dependency relationship between the API parameters.

The comparing of the degree of similarity may include using a ratio of an intersection to a union of nodes of the generated second graphs and nodes of each of the pre-stored representative graphs, as an index for determination of the degree of similarity.

According to one or more embodiments, a method of analyzing an evolutionary relationship of a malicious code includes: calculating a first degree of complexity of each of a plurality of malicious code binaries; selecting a root binary that is initially generated, by using the calculated first degree of complexity; and inferring an evolutionary order of the plurality of malicious code binaries, except for the root binary, based on the calculated first degree of complexity and a degree of distance between the plurality of malicious code binaries.

The selecting of the root binary may include selecting, as the root binary, a malicious code binary having a lowest first degree of complexity from among malicious code binaries classified into the same family from among the plurality of malicious code binaries.

The calculating of the first degree of complexity may include calculating the first degree of complexity by using a dynamic analysis and a static analysis, wherein the dynamic analysis extracts the number of application programming interface (API) sequences called by each of the plurality of malicious code binaries, and the static analysis extracts a second degree of complexity of each of the plurality of malicious code binaries, wherein the extracted second degree of complexity is determined as a sum of the number of nodes and the number of edges.

The first degree of complexity may be calculated according to equation 1:

$$\text{First degree of complexity} = w_1 s + w_2 d \quad [\text{Equation 1}]$$

(wherein $w_1$, $w_2$ are arbitrary values and correspond to weight values, s is a second degree of complexity, and d is the number of application programming interface (API) sequences.)

When certain malicious code binaries are packed from among the plurality of malicious code binaries, $w_1$ is less than $w_2$, when the certain malicious code binaries are anti-debugged, $w_2$ is less than $w_1$, and when the certain malicious code binaries are not packed and are not anti-debugged, $w_1$ is the same as $w_2$.

The degree of distance may be calculated according to equation 2:

$$D(p_i, p_j) = 1 - \frac{|p_i \cap p_j|}{|p_i \cup p_j|} \quad [\text{Equation 2}]$$

(wherein $p_i$ and $p_j$ each denotes a certain malicious code binary, $D(p_i, p_j)$ denotes the degree of distance between $p_i$ and $p_j$ and $$\frac{|p_i \cap p_j|}{|p_i \cup p_j|}$$

is a degree of similarity between $p_i$ and $p_j$)

The degree of similarity may be calculated by using the number of application programming interface (API) sequences.

The degree of similarity may be calculated by using at least one of a Needleman-Wunsch algorithm, a Smith-Waterman algorithm, and a Hirschberg's algorithm.

The inferring of the evolutionary order may include: identifying the root binary as $p_1$; when it is assumed that a set of malicious code binaries, for which the evolutionary order is identified, from among the plurality of malicious code binaries, is N, and a set of malicious code binaries, for which the evolutionary order is not identified, from among the plurality of malicious code binaries, is $N^c$, arranging the malicious code binaries of $N^c$ in an ascending order according to the first degree of complexity; selecting a malicious code binary having a lowest first degree of complexity from the set $N^c$ as $p_j$; selecting a malicious code binary of the set N, the malicious code binary satisfying equation 3, as $p_i$:

$$\min\{D(p_j, p_i) : p_i \in N\} \quad [\text{Equation 3}]$$

(wherein $p_i$ and $p_j$ each denotes a certain malicious code binary and $D(p_i, p_j)$ denotes the degree of distance between $p_i$ and $p_j$);

identifying the selected $p_j$ as an offspring of the selected $p_i$; calculating $D(p_j, p_k)$ with respect to $p_k$ and the identified $p_j$ which are malicious code binaries having no offspring from the set N; calculating D(a parent of $p_j$, $p_k$) with respect to the parent of $p_j$ and $p_k$; identifying $p_k$ as the parent of $p_j$, when $D(p_j, p_k)$ is less than D(the parent of $p_j$ $p_k$); and identifying the evolutionary order by repeating the operations in the inferring of the evolutionary order, until all of the plurality of malicious code binaries are included in the set N.

The inferring of the evolutionary order may further include deriving a graph according to the identified evolutionary order.

According to one or more embodiments, an apparatus for generating representative graphs for analyzing a function of a malicious code includes: a memory storing one or more instructions; and one or more processors configured to execute the one or more instructions stored in the memory to: obtain a source code from a pre-stored malicious file; generate, by analyzing the source code, a first graph in which each of nodes is formed of a portion of the source code; analyze a dependency relationship between parameters by analyzing the nodes of the first graph; generate second graphs indicating the analyzed dependency relationship between the parameters; cluster the second graphs based on a degree of similarity; and generate the representative graphs representing functions of each of clusters of the clustered second graphs.

The first graph may be a control flow graph (CFG), in which a basic block is formed by analyzing an abstract syntax tree, after the abstract syntax tree is generated by parsing the source code, the parameters may be application programming interface (API) parameters, and the second graphs may be API dependency graphs (ADGs) indicating a dependency relationship between the API parameters.

The representative graphs may be stored and a database (DB) may be generated.

The representative graphs may be generated by connecting only nodes having an appearance frequency exceeding a threshold value by adding each second graph.

The second graphs may be clustered by using a K-means clustering method.

According to one or more embodiments, an apparatus for analyzing a function of a malicious code includes: a memory storing one or more instructions; and one or more processors configured to execute the one or more instructions stored in the memory to: obtain a source code of a malicious file which is an object of analysis; generate, by analyzing the source code, a first graph in which each of nodes is formed of a portion of the source code; analyze a dependency relationship between parameters by analyzing the nodes of the first graph; generate second graphs indicating the analyzed dependency relationship between the parameters; and analyze the function of the malicious code by comparing a degree of similarity between each of pre-stored representative graphs and the generated second graphs.

The first graph may be a control flow graph (CFG), in which a basic block is formed by analyzing an abstract syntax tree, after the abstract syntax tree is generated by parsing the source code, the parameters may be application programming interface (API) parameters, and the second graphs may be API dependency graphs (ADGs) indicating a dependency relationship between the API parameters.

The degree of similarity may be compared by using a ratio of an intersection to a union of nodes of the generated second graphs and nodes of each of the pre-stored representative graphs, as an index for determination of the degree of similarity.

According to one or more embodiments, an apparatus for analyzing an evolutionary relationship of a malicious code includes:
 a memory storing one or more instructions; and one or more processors configured to execute the one or more instructions stored in the memory to: calculate a first degree of complexity of each of a plurality of malicious code binaries; select a root binary that is initially generated, by using the calculated first degree of complexity; and infer an evolutionary order of the plurality of malicious code binaries, except for the root binary, based on the calculated first degree of complexity and a degree of distance between the plurality of malicious code binaries.

According to one or more embodiments, a recording medium has recorded thereon a program for executing any one of the methods described above on a computer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
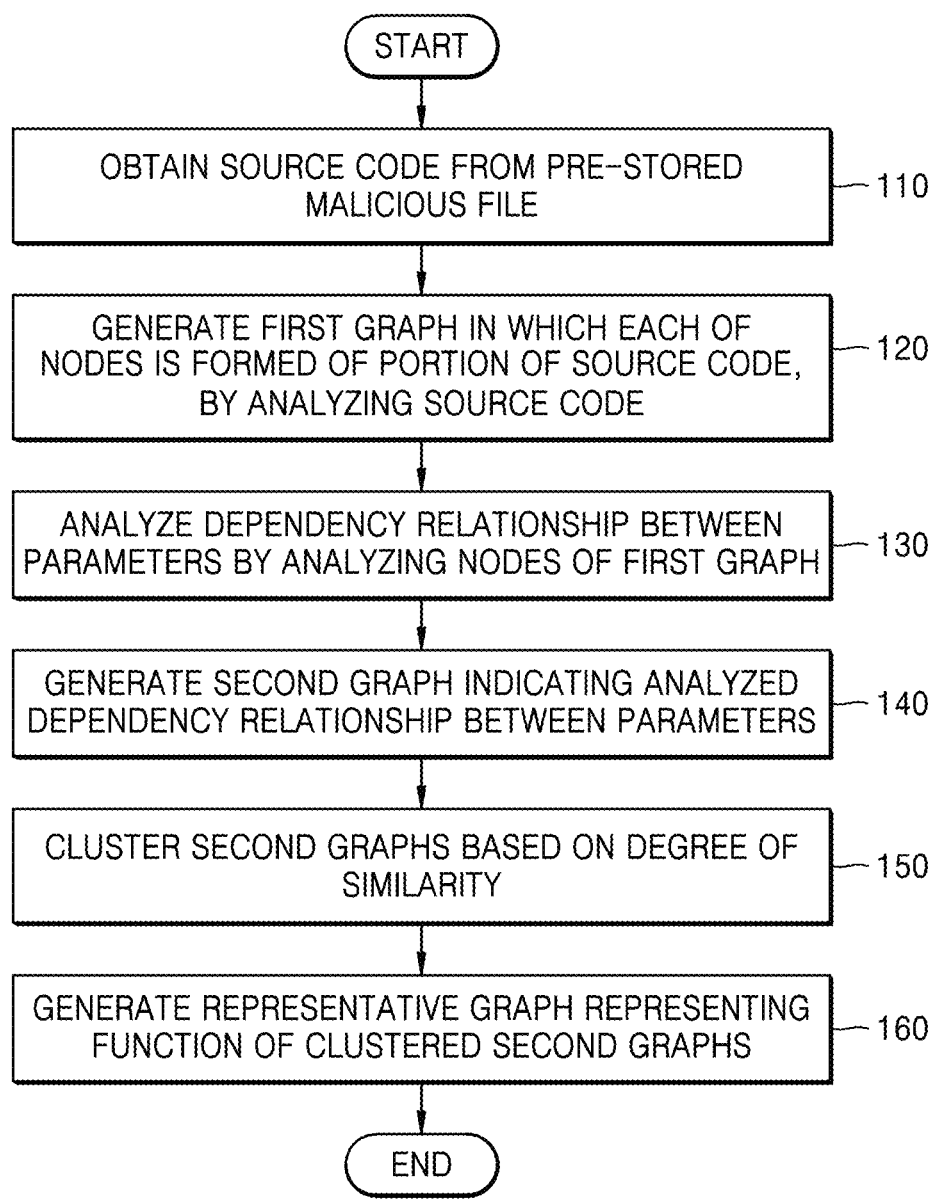
FIG. 1 is a flowchart of a method of generating representative graphs from a pre-stored malicious file.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in the embodiments are selected from among common terms that are currently widely used, in consideration of their function in the embodiments. However, the terms may become different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the embodiments are not merely designations of the terms, but the terms are defined based on the meaning of the terms and content throughout the embodiments.

Various modifications may be made to the embodiments, and the embodiments may have different forms. Thus, the embodiments will be described in detail with reference to the drawings in which the embodiments are illustrated. However, the embodiments should not be construed as being limited to particular realizations, and it should be understood that the embodiments may include all modifications, equivalents, and substitutes included in the concept and the technical scope of the embodiments. The terms used in this specification are merely used to describe the embodiments and are not aimed to limit the embodiments.

The terms used in the embodiments have meanings which can be generally understood by one of ordinary skill in the art, unless the terms are differently defined. General terms defined by dictionaries should be understood to have meanings which can be contextually understood in the art and should not be understood to have ideal or excessively formal meanings, unless they are particularly defined as such in the embodiments.

One or more embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ conventional techniques for electronics configuration, signal processing and/or data control. The words "mechanism," "element," "configuration," etc. may be broadly used and are not limited to mechanical or physical components. Also, the terms, such as "unit" or "module," described in the specification should be understood as a unit that processes at least one function or operation and that may be embodied in a hardware manner, a software manner, or a combination of the hardware manner and the software manner.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

Hereinafter, the disclosure will be described in detail with reference to the accompanying drawings.

FIG. 1 is a flowchart of a method of generating a representative graph from a malicious file.

Referring to FIG. 1, source codes may be obtained from a pre-stored malicious file, in operation 110. A plurality of nodes may be formed with the source codes divided based on syntax and a graph may be generated by including the plurality of nodes (operation 120). The graph generated as above may be called a first graph. The first graph may be a control flow graph (CFG). The CFG may be among pieces of information that may be generated from the source codes. In the CFG, every path to be traversed by a program while the program is executed is indicated as a node and an edge based on a graph writing method. The node may be indicated as a circular or a square shape and the edge may be indicated as a line or an arrow. It is not limited thereto. It will be understood by one of ordinary skill in the art that the node and the edge may further include other shapes. A method of obtaining the source codes will be described in more detail with reference to FIG. 4.

By analyzing the nodes of the generated first graph, a dependency relationship between parameters may be identified (operation 130). The parameter may function as a variable causing a function call in the source code. The parameter may include an application programming interface (API) parameter and a function may be an API. The dependency relationship between the parameters may denote a correlation between different factors with the medium of a function. Here, the factor may be a parameter value or a return value.

Figure 5A:
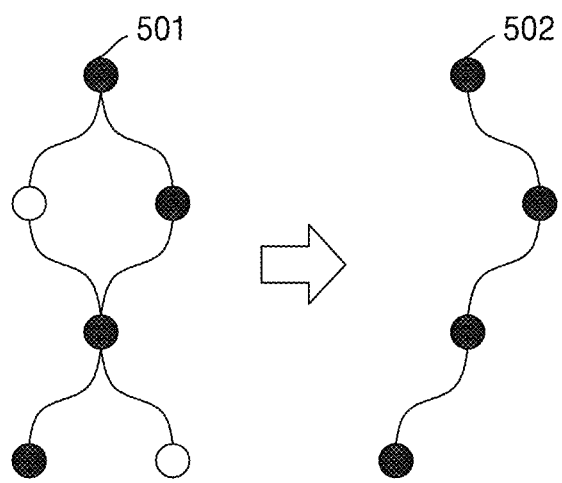
FIG. 5A is a conceptual diagram of a second graph indicating a dependency relationship between parameters, according to an embodiment.

In operation 140, a second graph indicating an analyzed dependency relationship between the parameters may be generated. The second graph may be an API dependency graph (ADG). The generated second graph may be stored in a database (DB) for subsequently classifying and clustering malicious codes for each function. Each of the second graphs stored in the DB may have a different structure of a node and an edge. FIG. 5A may be an example of the second graph (or a dependency graph) indicating the dependency relationship between the parameters. FIG. 5A will be described in more detail below.

In operation 150, the second graphs may be clustered based on a degree of similarity between each graph. Provided that the second graphs having similar functions have similar shapes as each other, clustering may refer to classifying or grouping the second graphs into groups (sets) according to functions of malicious codes each included in the second graphs. Methods of clustering may include gathering graphs located in a less distance into the same group (set).

In the disclosure, for a distance concept in an analysis between data in the form of a graph, an edit distance may be used. The edit distance may also be used for determining a degree of similarity between data or graphs, when clustering the data or the graphs. Graphs having the least (or the smallest) edit distance are the graphs having the highest degree of similarity. The edit distance denotes a sum of the number of calculations including deletions and additions required to make two different pieces of data the same. For example, the edit distance of data ABCD and data ABBA may be 4, because BA has to be deleted and CD has to be added. In the case of the data in the form of a graph, when there are two different graphs, the edit distance is a sum of the number of calculations including additions and deletions required to make one graph have the same node and the same edge as the other graph. As a clustering method, a K-means clustering algorithm may be applied. The K-means clustering algorithm denotes an algorithm configured to cluster pieces of data that are close to one another based on a distance concept into K clusters. Each cluster has one center, and pieces of data assigned to a same center may be gathered into one cluster.

In operation 160, a representative graph may be generated from the classified second graphs. Each representative graph may represent a malicious code cluster corresponding to each function. The representative graph may be a representative ADG (RADG). Also, the representative graphs may be stored in a memory 1320 to generate a DB. Methods of generating a representative graph will be described in more detail in FIG. 5C.

Types of malicious codes may be classified into a ransomware type, a worm type (a proliferation type), a phishing type, a banker type, a trojan/bot type, an adware type, a spyware type, an attacking tool type, a deceit type, etc., and functions of the malicious codes may be classified into a boot attack, information snatching, backdoor, data counterfeiting, social engineering-type detection, malware, detection bypassing, hooking, security system bypassing, system abstract, diffusion, system counterfeiting/modulation, banking attack, abnormal networking, anti-debugging, etc., but the criteria of classification are not limited thereto.

Figure 2:
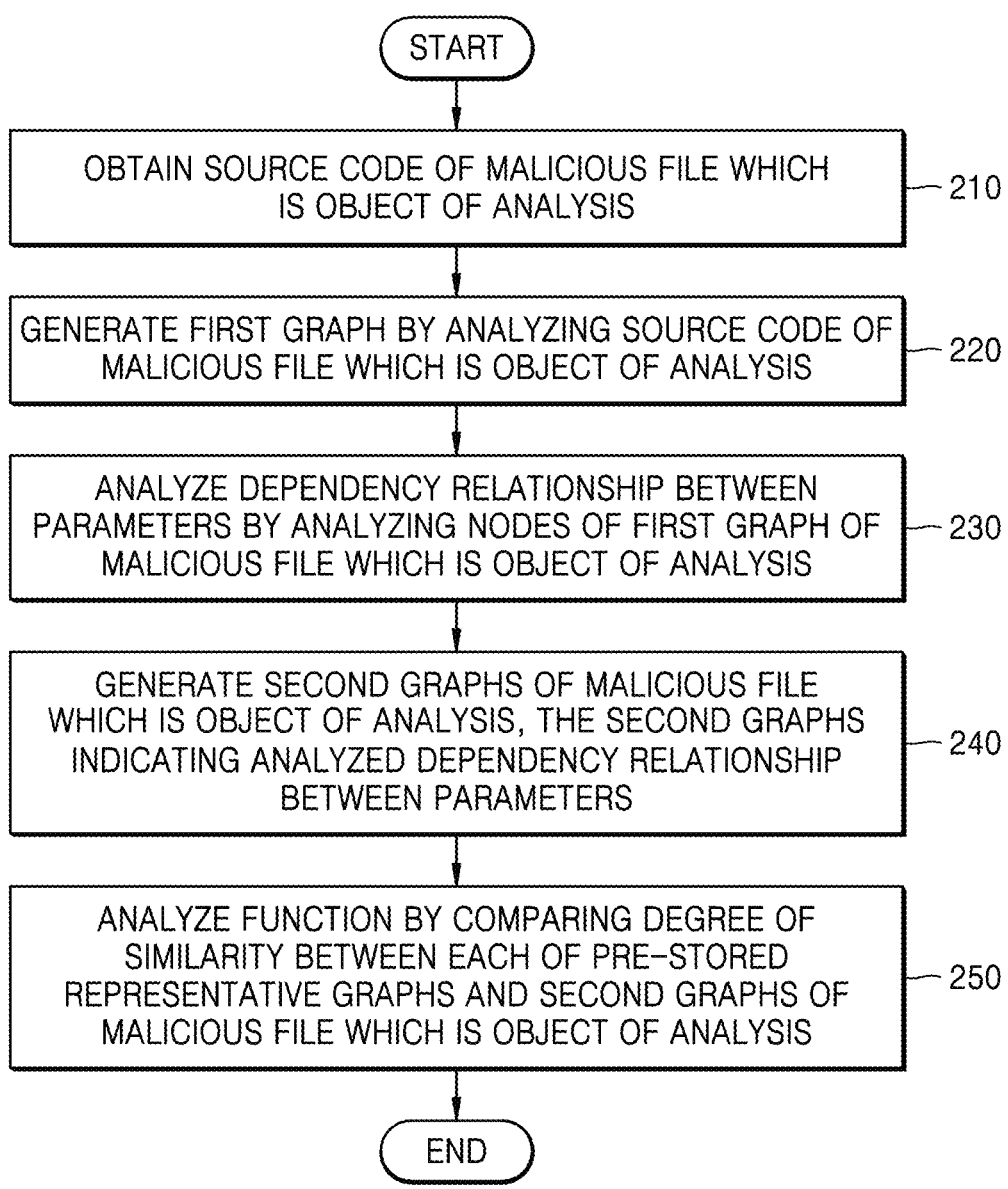
FIG. 2 is a flowchart of a method of analyzing a function of a malicious file which is an object of analysis.

FIG. 2 is a flowchart of a method of analyzing a function of a malicious file which is an object of analysis.

In operation 210, a source code may be obtained from a malicious file which is to be analyzed. The malicious file to be analyzed refers to a file including a malicious code, a function of which is to be analyzed. The file may be in the form of an execution file (.exe), a patch file (.pat), and a document file (.pdf, .hwp, .doc). However, it is not limited thereto. It will be understood by one of ordinary skill in the art that the file may further have other extension forms. A method of obtaining the source code is the same as the method described above in FIG. 1.

A first graph may be generated by analyzing the obtained source code of the malicious file to be analyzed (operation 220). A method of generating the first graph is also the same as the method described above in FIG. 1.

A dependency relationship between parameters may be derived by analyzing a node of the first graph generated from the malicious file, the function of which is to be analyzed (operation 230). The parameter denotes the same thing as described in FIG. 1.

In operation 240, a second graph of the malicious file which is to be analyzed, the second graph indicating the identified or analyzed dependency relationship between the parameters may be generated. The second graph in FIG. 2 corresponds to the second graph in FIG. 1, and thus, the same aspects will not be repeatedly described.

The second graph generated from the malicious file to be analyzed may be stored to generate a DB. Subsequently, the second graph of the malicious file to be analyzed may be extracted from the DB and may be at once compared with representative graphs each representing a malicious function (see FIG. 6A).

In operation 250, a degree of similarity between the second graph generated from the malicious file to be analyzed and pre-stored representative graphs may be compared. By identifying a function the representative graphs having the highest degree of similarity, a function of a corresponding malicious code may be identified. A method of comparing the degree of similarity will be described in more detail below with reference to FIG. 6.

Figure 3:
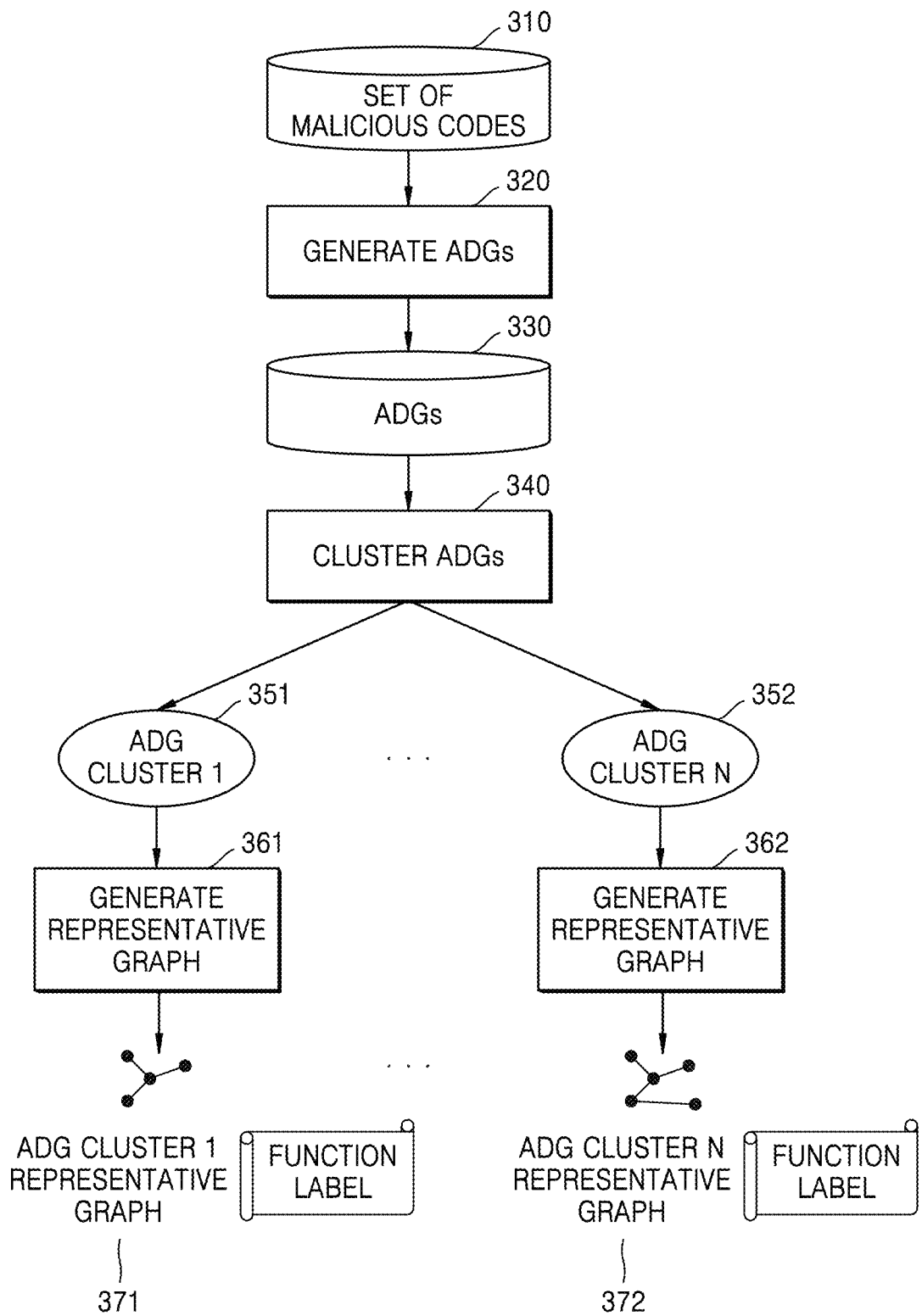
FIG. 3 is a flowchart of a method of generating an application programming interface dependency graph (ADG) which is representative of clusters, from a set of malicious code files, according to an embodiment.

FIG. 3 is a flowchart of a method of generating an ADG that is representative of a cluster, from a set of malicious code files, according to an embodiment.

In operation 310, a plurality of ADGs may be generated from pre-existing malicious codes to prepare a malicious code set for generating an RADG representing each function. The malicious code set may include the pre-existing malicious codes. The malicious code set may include malicious codes which exist in the form of a machine language or in the form of a malicious file. A process of generating the representative graph from the malicious code set will be described below with reference to FIG. 4.

In operation 320, the ADG may be generated from the malicious code. A process of generating the ADG will also be described in more detail in FIG. 4.

A plurality of ADGs may be made as DBs for performing a clustering operation (operation 330). The ADGs denote a set of a plurality of ADGs generated through an ADG generation method from a plurality of malicious code sets. Graphs generated from malicious codes having various functions may co-exist in the ADGs.

An ADG clustering operation may be performed to classify the ADGs including various functions for each function (operation 340). Because the ADGs of the malicious codes having the same functions may have similar shapes, the ADGs may be clustered based on a degree of similarity thereof. The clustering may be performed by using an edit distance as described in FIG. 1 and by using a K-means clustering algorithm, which is a method of clustering graphs located in a less distance into a set.

An RADG may be generated to represent each of clusters ADG cluster 1 and ADG cluster N (refer to operations 351 and 352)) from ADG clusters in which similar ADGs are clustered via the clustering operation. Comparing each ADG with an ADG of a malicious code to be analyzed, one by one, lowers the speed of analysis, hampering the effective analysis of the malicious codes. Thus, for the efficient analysis of the malicious code functions, an RADG representing a malicious function may be generated (operations 361 and 362). Each RADG may be functionally labeled to indicate a function of the corresponding RADG, so that it may be easily identified as to which function each RADG represents or each RADG is easily used for artificial intelligence (operations 371 and 372).

Figure 4:
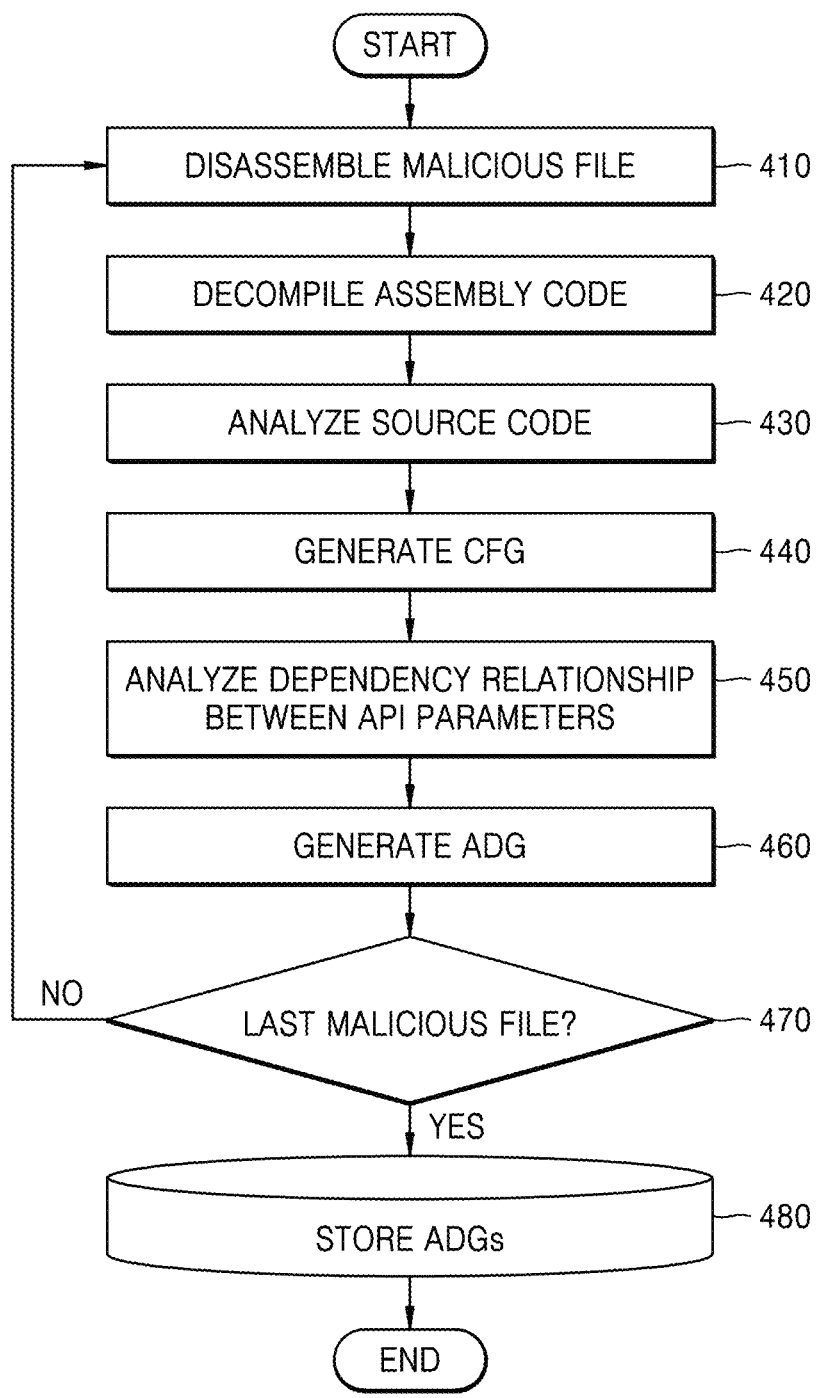
FIG. 4 is a flowchart for describing a detailed process in which a plurality of ADGs are generated from a malicious file and a database (DB) is generated, according to an embodiment.

FIG. 4 is a flowchart for describing a detailed process in which a plurality of ADGs are generated from a malicious file and a DB is generated, according to an embodiment.

An ADG DB may be used as a comparison model for an analysis of functions of malicious codes. A static analysis may denote an analysis that analyzes a code itself without executing a malicious code file, unlike a dynamic analysis. For the static analysis of a malicious file, a source code of a malicious code which is an object of analysis has to be obtained. The malicious code which is to be analyzed may be a malicious code which is unpacked.

Referring to FIG. 4, the source code of the malicious code may be obtained by analyzing the malicious code file. According to an embodiment, the malicious code file may be in the form of a machine language. The machine language may be disassembled to obtain an assembly language (operation 410), and the obtained assembly language may be decompiled again to obtain the source code (operation 420). According to an embodiment, the source code may include a pseudo code or a C code. However, the source code is not limited thereto and may include other programming languages, which will be understood by one of ordinary skill in the art.

A first graph may be generated by analyzing the source code (operation 430). According to an embodiment, that the first graph is generated may denote that a CFG is generated (operation 440).

The source code, which is obtained to generate the CFG, may be parsed, and thus, the code may be divided for each syntactic phrase. For example, there may be an if-syntactic phrase, a while-syntactic phrase, and a go to-syntactic phrase. However, it is not limited thereto and one of ordinary skill in the art will understand that other general syntactic phrases may further be included. The source code, which is obtained from the malicious code file and parsed, may be analyzed to form an abstract syntax tree. Among syntactic phrases in the abstract syntax tree, a basic block may be identified, and the CFG may be formed by including the basic block. Here, the abstract syntax tree may be a tree having an abstract syntax structure of the source code written in a programming language, and the basic block may denote a block, for which a practice branch does not get in or get out in the middle thereof, except for the start and the end thereof. When the CFG is generated, codes in the CFG may be parsed again based on a row and a dependency relationship between parameters may be analyzed. According to an embodiment, the analysis of the dependency relationship between the parameters may be an analysis of a dependency relationship between API parameters (operation S450).

An API parameter may be used an input of an API, and as an output of the API, another API parameter or a return value may be returned. Again, the return value may become a parameter of another API. According to an embodiment, when x, a parameter of an API API_1, is input into the API API_1 and a value of y is output as a return value, the value of y may become a parameter of an API API_2 again, and x and y of the APIs API_1 and the API_2 may have a dependency relationship between parameters.

The analysis of the dependency relationship between API parameters may be performed by using a data flow analysis method. The data flow analysis method refers to a method of gathering information about values which variables may have at specific points in a computer program. According to an embodiment, the data flow analysis method uses reaching definition, which is a forward direction analysis. The purpose of the reaching definition analysis is to identify upon which point an effect of an instruction defining a parameter reaches. For the analysis, codes in a CFG generated in a unit of a function are analyzed for each row to call a function, and when a call assignment syntactic phrase that assigns a value of the function to a variable is detected, the variable to which the value of the function is assigned, a name of the function that is called, and location information of the corresponding syntactic phase may be stored in a queue. Thereafter, it may be analyzed to which point from the location of the corresponding syntactic phrase the variable reaches without being killed, by taking elements in the queue one by one. When, after a value is assigned to a variable, a new value is assigned to the variable, it corresponds to a case that the new value covers the previous value, and thus, the variable may be determined as killed. In the disclosure, when an ADG is generated, the analysis may be performed based on a unit of a basic block. When a variable is killed in the block, the analysis may be ended, and when the variable is not killed until the end of the block, an analysis may be continued for a successor block of the basic block which is analyzed. When the analyzed variable is not killed and a function call having the variable as a factor is detected, a graph may be generated by connecting a function having a variable to which a value is assigned with a function having a variable as a factor via a trunk line. Here, the function may denote a node.

A second graph may be generated by analyzing a dependency relationship between parameters. According to an embodiment, that the second graph is generated denotes that the ADG is generated (operation 460).

In operation 470, it may be determined whether a malicious file for which the ADG is generated is the last malicious file. When the malicious file is not the last malicious file, the process may go back to the first operation to generate an ADG of another malicious file, and when the malicious file is the last malicious file, all generated ADGs may be stored in the DB. By using this method, all pre-existing malicious files may be converted into the forms of the ADG and may be stored in the DB (operation 480).

FIG. 5A is a conceptual diagram of a second graph 502 indicating a dependency relationship between parameters, according to an embodiment.

The second graph 502 may be generated by analyzing the dependency relationship between parameters by analyzing nodes of a first graph 501. The second graph 502 may denote a graph generated by connecting only nodes (black nodes) including the parameters having the dependency relationship between the parameters in the first graph 501.

Figure 5B:
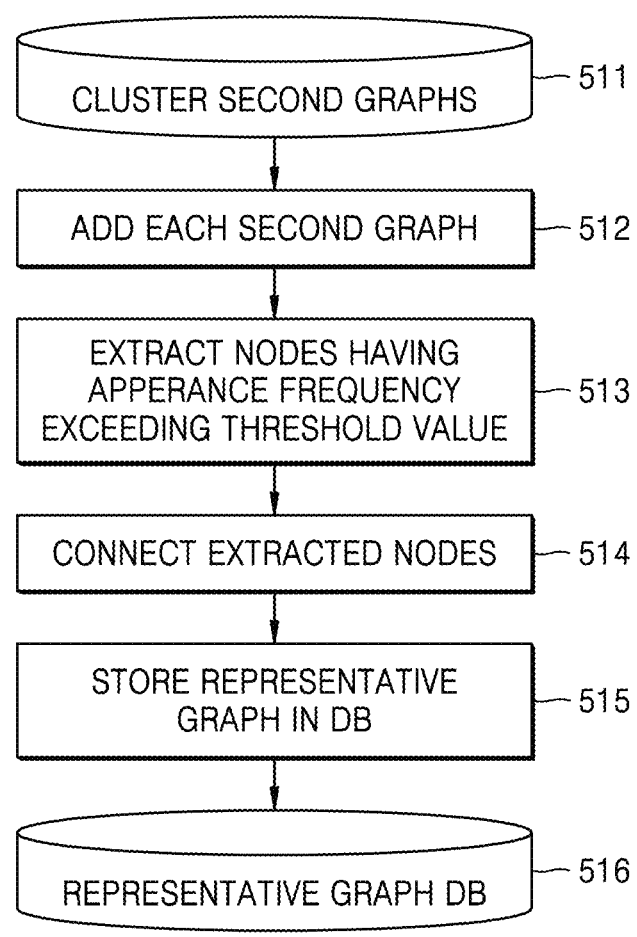
FIG. 5B is a view for describing a process of generating representative graphs from clusters of clustered second graphs and storing the generated representative graphs in a DB.

FIG. 5B is a view for describing a process of generating representative graphs from clusters of clustered second graphs and storing the generated representative graphs in a DB, according to an embodiment.

Each of the second graphs existing in each of the clusters (operation 511) may be added (operations 512) to generate representative graphs representing each cluster of the plurality of clusters. Methods of adding the graphs will be described below in detail with reference to FIG. 5C.

Only nodes having an appearance frequency exceeding a threshold value may be extracted from the added graphs (operation 513). When adding the graphs, when all of nodes and edges of the graphs are merged, the nodes and the edges are included without characteristics thereof being taken into account, and thus, it may be difficult to recognize the graph as a graph representing a function of a particular malicious code. Thus, only the nodes or the edges having an appearance frequency exceeding a certain reference value (a threshold value) may be to be merged. The threshold value may be heuristically defined. When the threshold value is 10% of the number of nodes appearing most frequently, only nodes exceeding 10% of the number of the most frequently-appearing nodes may be to be merged.

In operation 514, the representative graph may be generated by connecting the extracted nodes. When a weight of a connecting line (an edge) is not indicated, the weight may be 1. However, the weight may be indicated as various values according to necessity, based on a degree of dependency relationship between parameters, etc.

The representative graph representing the function of the malicious codes may be stored (operation 515) in the DB to generate the DB. The representative graph may indicate the function of the malicious codes, and thus, may be a comparison model for a malicious code which is to be compared. The DB of the representative graph may be stored in a memory 1310 according to the disclosure and later may be used for analyzing the function of the malicious code.

Figure 5C:
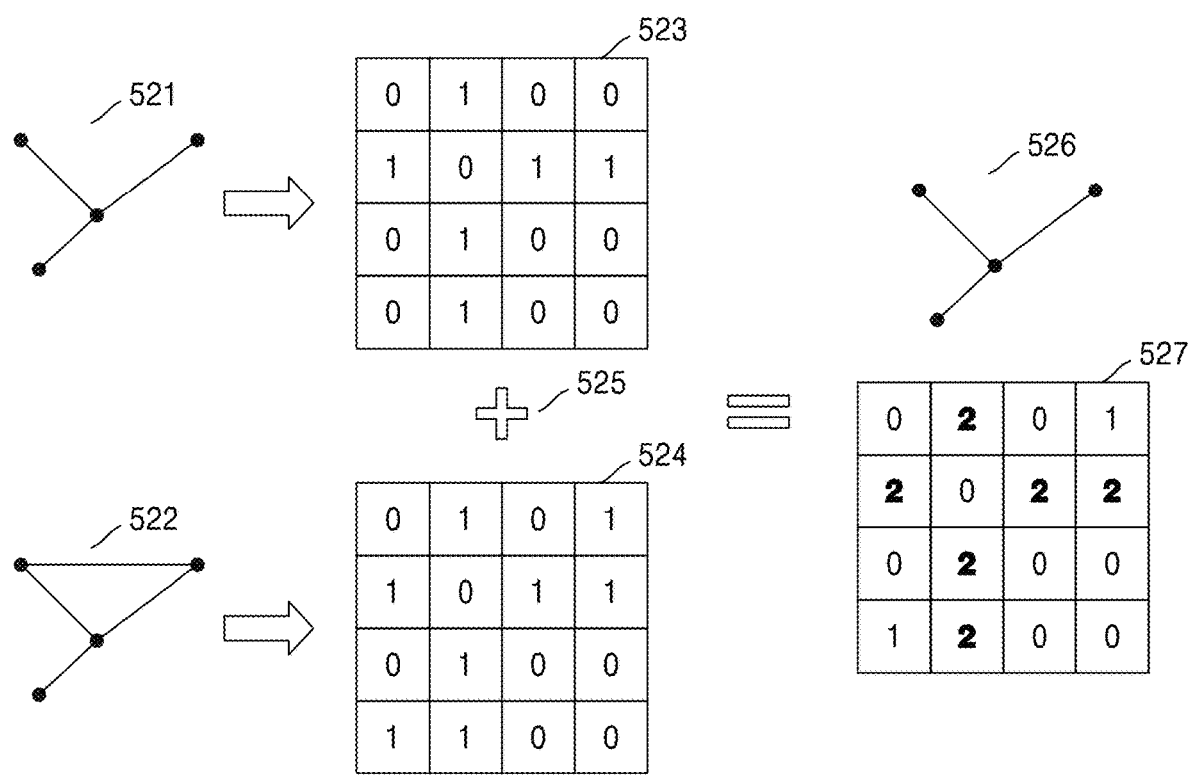
FIG. 5C is a view of an example of a method of generating representative graphs by adding second graphs, according to an embodiment.

FIG. 5C is a view of an example of a method of generating a representative graph by adding second graphs, according to an embodiment.

Referring to FIG. 5C, second graphs 521 and 522 may be indicated as matrices 523 and 524 according to the number of nodes. For example, when the number of nodes is 4, a square matrix of 4 by 4 including four rows and four columns may be formed. The square matrix may be a symmetric matrix and all components on a principal diagonal line of the square matrix may be 0. When indicating a graph as a matrix, a value of a weight of an edge may be written at a matrix component, when a node corresponding to each number is connected to each other. When the node corresponding to each number is not connected to each other, 0 may be written.

According to an embodiment, when a second node is connected to a first node, a third node, and a fourth node via mode-connection, 1 may be written at all of (2, 1), (2, 3), (2, 4), (1, 2), (3, 2), and (4, 2). After the graph is indicated as the matrix, components of the matrices may be summed (525).

The summed component of the matrix 527 may denote an appearance frequency of each node. When a value of a component corresponding to a node exceeds a threshold value, the node may be to be merged, and the nodes to be merged may be extracted and connected via a trunk line to generate the representative graph 526.

Figure 6A:
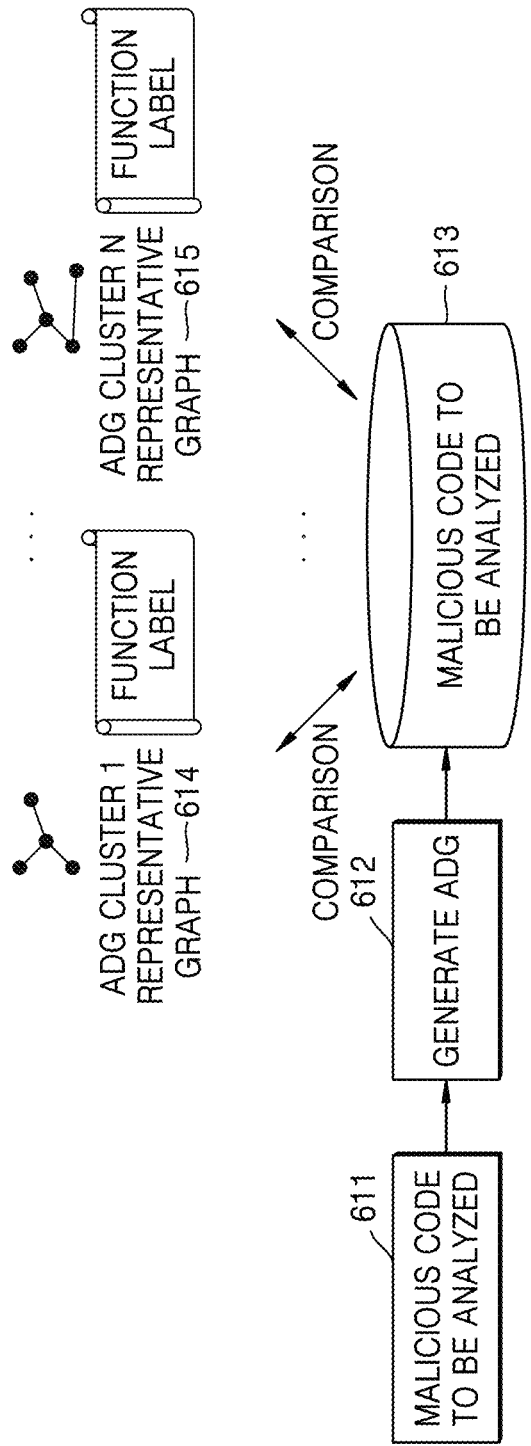
FIG. 6A is a flowchart of a method of analyzing a function by comparing an ADG of a malicious code which is to be analyzed with each of representative graphs, according to an embodiment.

FIG. 6A is a flowchart of a method of analyzing a function by comparing an ADG of a malicious code which is to be analyzed with each representative graph, according to an embodiment.

As described in FIG. 4, an ADG may be generated from a malicious code 611 to be analyzed (operation 612). In operation 613, an ADG may be extracted from a DB of ADGs of the malicious code 611 to be analyzed and may be compared with a plurality of RADGs each representing a function. Based on this method, functions of a plurality of malicious codes may be analyzed at once. By analyzing the functions of the plurality of malicious codes at once, the accuracy and the speed of the analysis may be improved. The functions of the malicious codes may be identified via a function label of the RADGs. The function label denotes the same function label as described in FIG. 3.

Figure 6B:
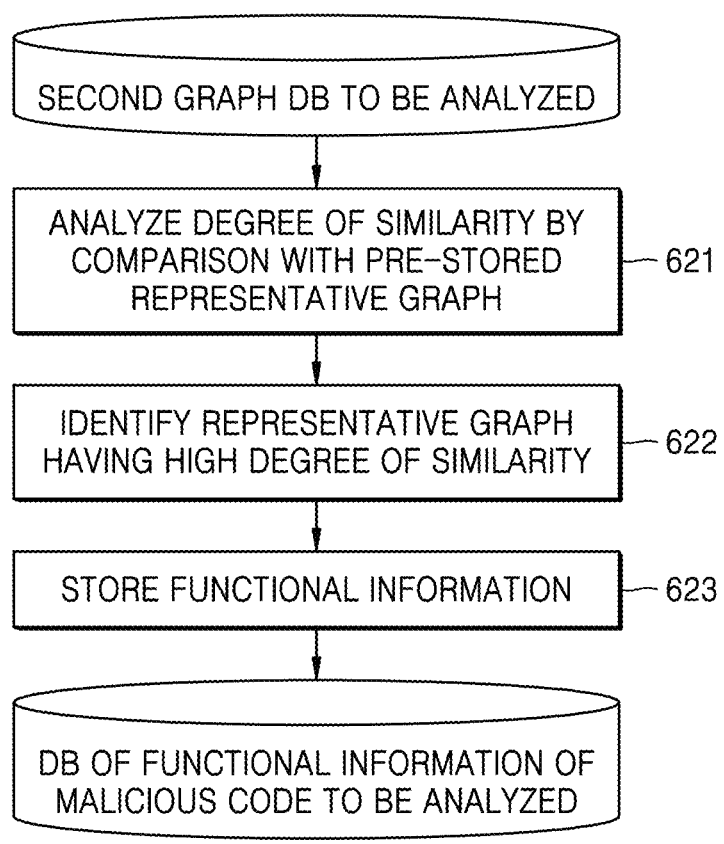
FIG. 6B is a flowchart of a method of analyzing a second graph DB which is to be analyzed, storing functional information of a malicious code, and generating a DB, according to an embodiment.

FIG. 6B is a flowchart of a method of analyzing a second graph DB, which is to be analyzed, storing functional information about a malicious code, and generating a DB, according to an embodiment.

In operation 621, a degree of similarity between a second graph to be analyzed in the second graph DB and pre-stored representative graphs may be compared. According to an embodiment, the comparison of the degree of similarity may use an edit distance. With respect to the comparison of the degree of similarity, when the degree of similarity is determined only based on the absolute number of nodes, representative graphs having a greater number of nodes may come to have a high weight value, so as to cause a wrong determination of the degree of similarity. Thus, as an index for determining the degree of similarity, a ratio of an intersection to a union of nodes of the generated second graph and nodes of each pre-stored representative graph may be used. The intersection includes nodes that two graphs under comparison have in common and the union includes all of nodes included in the two compared graphs. For example, as the index has a higher value (a higher ratio), a higher degree of similarity may be determined.

In operation 622, a representative graph having a high degree of similarity may be identified, and through the identified representative graph, it may be determined which function the malicious code, from which the second graph to be analyzed is generated, performs.

The functional information of the malicious code, in which the function of the malicious code is analyzed, may be stored and made as a DB (operation S623). The DB of the functional information may be subsequently used to analyze a function of the same or substantially the same malicious code. The analyzed second graph may be again included in the second graph cluster in FIG. 5B in operation 511 and may become data for a comparison model to be subsequently used for analyzing functions of other malicious codes.

Figure 7:
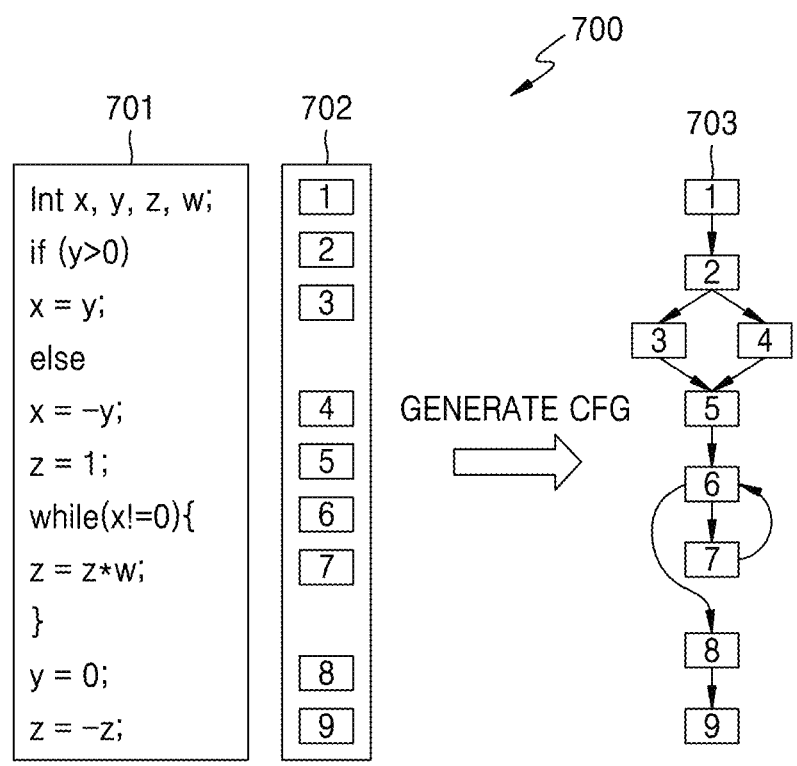
FIG. 7 is a view for describing a process in which a source code is analyzed and a control flow graph (CFG) is generated, according to an embodiment.

FIG. 7 is a view for describing a process in which a source code is analyzed and a CFG is generated, according to an embodiment.

FIG. 7 illustrates a process 700 in which a source code is converted into a CFG to analyze a dependency relationship between parameters. A number may be assigned to each of rows or each of syntactic phrases of the source code 701 (operation S702). A block corresponding to each number may be a node, and when nodes are connected according to an execution order of the code, a CFG 703 may be generated.

For example, in the case of a variable declaration, a sequential movement may be performed to a next row (1→2). In the case of an if-phrase, other rows may be executed according to a condition, and thus, a junction may be formed (2→3 or 2→4). Again, when a row of a sequential variable declaration is executed, the junction may be gathered to one point (3→5 or 4→5). In the case of a while-phrase, a loop may be formed according to a condition, and the loop may be escaped (6→7 or 6→8).

Figure 8:
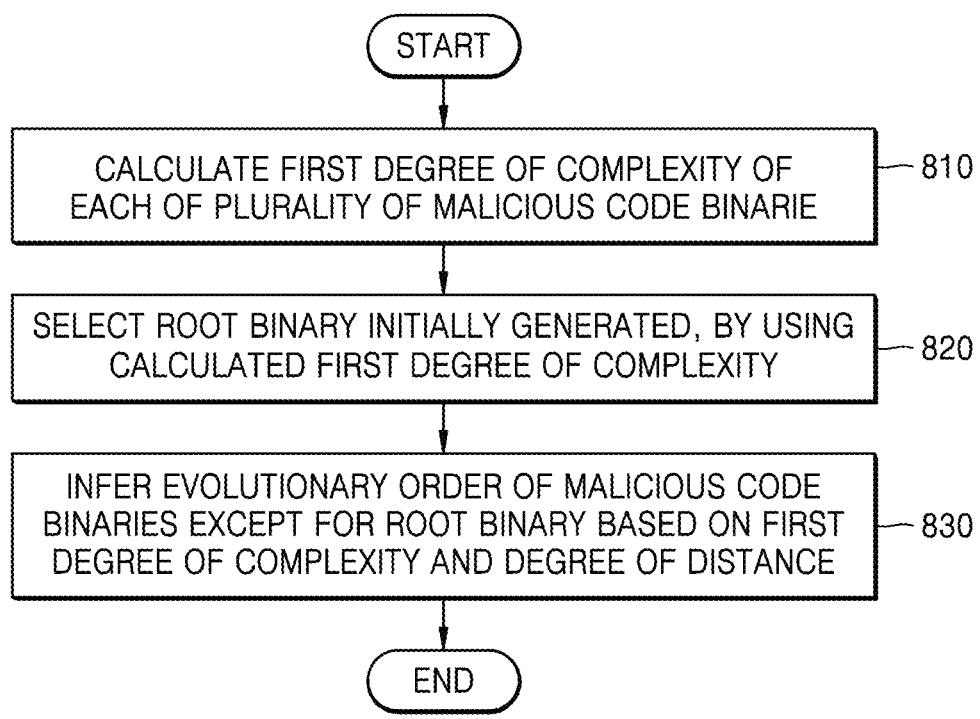
FIG. 8 is a flowchart of a method of analyzing an evolutionary relationship of a malicious code, according to an embodiment.

FIG. 8 is a flowchart of a method of analyzing an evolutionary relationship of a malicious code, according to an embodiment. Referring to FIG. 8, in operation 810, an apparatus for analyzing the evolutionary relationship of the malicious code may calculate a first degree of complexity of each of a plurality of malicious code binaries.

The malicious code may include a mutant malicious code in addition to a pre-existing malicious code. The mutant malicious code may be generated based on various methods described below.

The mutant malicious code may be generated based on an obfuscation method. The obfuscation method may include dead code insertion, register reassignment, subroutine reordering, instruction substitution, code transportation, code integration, etc.

The malicious code binaries may be a machine language formed of 0 or 1 for a malicious code written for a malicious purpose to be internally used by a computer. The malicious code binaries may indicate an execution file rather than a source code in a distributed program. The malicious code binaries may be generally understood by one of ordinary skill in the art.

The first degree of complexity denotes a degree of complexity of the malicious code binaries and may denote the performance or a degree of complexity of the malicious code.

The plurality of malicious code binaries may be given as an input value in a system and may include malicious code binaries classified into the same family. However, it is not limited thereto.

When a vaccine company, a computer programming company, etc. input malicious code binaries in a program manufactured by the vaccine company, the computer programming company, etc., the malicious code binaries manufactured by the same manufacturer or having the same or substantially the same functions are clustered into the same cluster. The malicious code binaries classified into the same family may denote the malicious code binaries classified into the same cluster. For example, clusters of clustered second graphs may include malicious code binaries included in the graph.

The first degree of complexity of the malicious code binaries may be calculated by using a dynamic analysis and a static analysis, wherein the dynamic analysis denotes a method of executing and analyzing a malicious code file which is to be analyzed and the static analysis denotes a method of analyzing the malicious code file without executing the malicious code file.

The apparatus for analyzing the evolutionary relationship of the malicious code may calculate the first degree of complexity according to following Equation 1 based on information extracted by performing the dynamic analysis and the static analysis.

$$\text{First degree of complexity} = w_1 s + w_2 d \quad \text{[Equation 1]}$$

In Equation 1 above, $w_1$ and $w_2$ are arbitrary values and correspond to certain weight values and may be heuristically defined. s may correspond to the information extracted by performing the static analysis and may denote a second degree of complexity, and d may correspond to the information extracted by performing the dynamic analysis and may denote the number of API sequences.

The second degree of complexity denotes a degree of complexity of a call graph, which is a graph generated by a static analyzer and which indicates a call relationship between unit programs included in one program, and the second degree of complexity may indicate the sum of the number of nodes and the number of edges indicated in the call graph.

When a program in a window is executed, functions are called. Here, the order of system functions that are called is referred to as an API sequence, and the number of API sequences may denote the number of APIs included in a sequence.

In operation 820, the apparatus for analyzing the evolutionary relationship of the malicious code may select a root binary ROOT by using the first degree of complexity calculated in operation 810.

The root binary is a first malicious code binary initially generated in an evolutionary relationship of programs, and a malicious code binary having the lowest first degree of complexity may be selected as the root binary. For example, the apparatus for analyzing the evolutionary relationship of the malicious code may calculate the first degree of complexity of each of malicious code binaries classified into the same family and may select the malicious code binary having the lowest calculated first degree of complexity as the root binary. Operations 810 and 820 will be described below in detail in FIG. 9.

In operation 830, the apparatus for analyzing the evolutionary relationship of the malicious code may infer an evolutionary order of the malicious code binaries, except for the root binary, based on the calculated first degree of complexity and a degree of distance between the malicious code binaries. The apparatus for analyzing the evolutionary relationship of the malicious code may use the degree of distance to infer the evolutionary order of the malicious code binaries and the degree of distance may be calculated according to the following Equation 2.

$$D(p_i, p_j) = 1 - \frac{|p_i \cap p_j|}{|p_i \cup p_j|} \quad \text{[Equation 2]}$$

(In Equation 2 above, $p_i$ and $p_j$ each denotes a certain malicious code binary, $D(p_i, p_j)$ denotes a degree of distance between, $p_i$, $p_j$ and $$\frac{|p_i \cap p_j|}{|p_i \cup p_j|}$$

denotes a degree of similarity of. $p_i$, $p_j$ The degree of similarity may denote a Jaccard degree of similarity, and the degree of distance may be a value generated by subtracting the Jaccard degree of similarity from 1.

The apparatus for analyzing the evolutionary relationship of the malicious code may calculate the degree of similarity by using the number of API sequences. For example, when the number of API sequences of each of a first malicious code binary and a second malicious code binary is 100, and the number of API sequences commonly called is 50, $|p_i \cap p_j|$, is 50 and $|p_i \cup p_j|$ is 150, and thus, the degree of similarity may be calculated as. 50/150

Also, the apparatus for analyzing the evolutionary relationship of the malicious code may calculate the degree of similarity by using at least one of a Needleman-Wunsch algorithm, a Smith-Waterman algorithm, and a Hirschberg's algorithm.

The Needleman-Wunsch algorithm calculates a comprehensive similarity score with respect to the total length of hierarchies to be compared, and may be an adequate algorithm when lengths of two hierarchies to be compared are similar and all characters of the hierarchies are important. The Smith-Waterman algorithm is used for determining a similar area of parts of hierarchies to be compared. According to the Smith-Waterman algorithm, rather than considering the entire sequence, every part of lengths as possible may be compared and a degree of similarity may be measured. The Hirschberg's algorithm may be an algorithm to find an optimal hierarchical order between two hierarchies.

According to an embodiment, when calculating the number of API sequences that are commonly called, by comparing the API sequences that are called while each of the malicious code binaries is dynamically executed, at least one of a Needleman-Wunsch algorithm for the global alignment in which the entire sequences are compared, a Smith-Waterman algorithm for the local alignment in which parts of sequences are compared, and a Hirschberg's algorithm for optimization of a spatial degree of complexity may be used. However, the disclosure is not limited thereto.

The apparatus for analyzing the evolutionary relationship of the malicious code may infer the evolutionary order of the malicious code binaries except for the root binary based on the first degree of complexity and the degree of distance, and operation 830 will be described in detail below with reference to FIG. 10.

Figure 9:
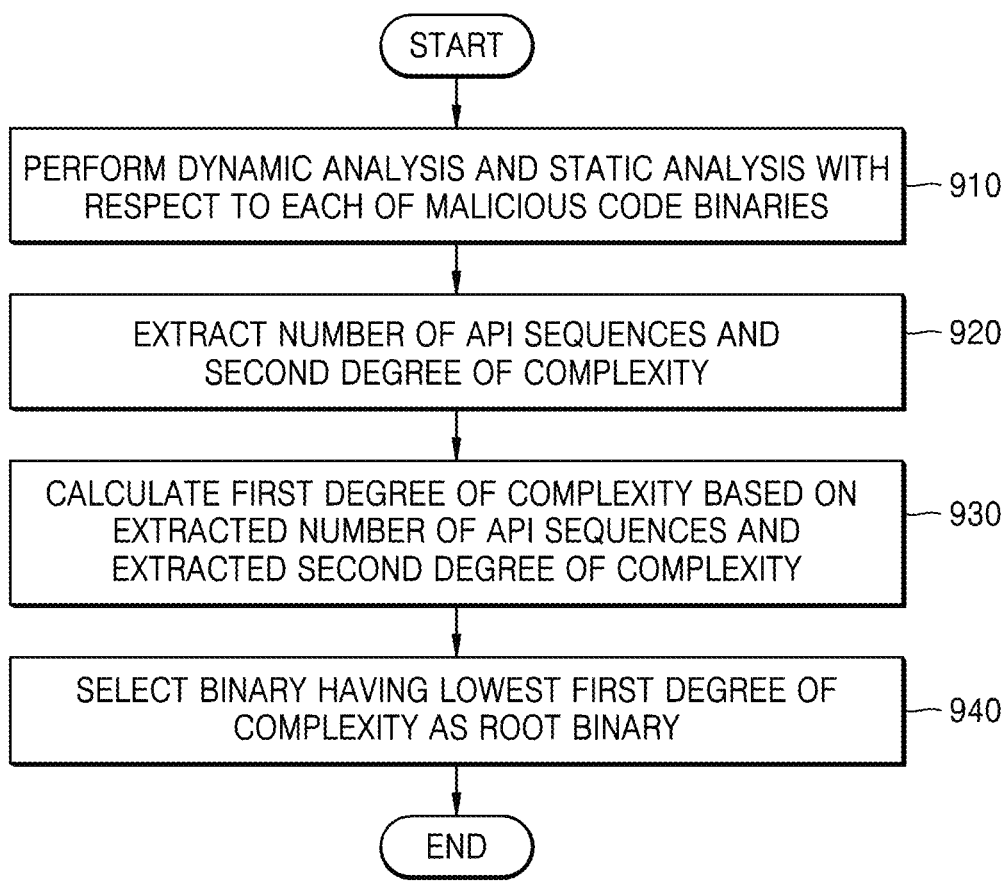
FIG. 9 is a detailed flowchart of operations S810 and S820 illustrated in FIG. 8.

FIG. 9 is a detailed flowchart of operations 810 and 820 illustrated in FIG. 8. FIG. 9 corresponds to operation 810 and operation 820 of FIG. 8, and thus, repeated descriptions will not be given.

Referring to FIG. 9, in operation 910, the apparatus for analyzing the evolutionary relationship of the malicious code may perform a dynamic analysis and a static analysis for each of the malicious code binaries. The malicious code binaries may denote malicious code binaries classified into the same family, but are not limited thereto.

According to an embodiment, when performing a dynamic analysis of malicious code binaries, a cuckoo sandbox may be used. A result value indicated after the malicious code binaries are executed in a sandbox environment may be used as information. The information provided from the cuckoo sandbox may be indicated in the form of a javascript object notation (JSON) file and the JASON file may include API sequence information.

The cuckoo sandbox is an automated system for a dynamic analysis of a malicious code and is used to test a suspicious file in an isolated environment. Also, JSON is a format indicating a data object based on an attribute and a value in order to replace data having a less capacity in a web and a computer program. A result of the cuckoo sandbox may be generated in the JSON format.

Also, when performing a static analysis of the malicious code binaries, information about a call graph may be obtained. A node of the call graph may denote a unit program, and an edge of the call graph may denote a call between unit programs.

In operation 920, the apparatus for analyzing the evolutionary relationship of the malicious code may extract the number of API sequences and a degree of second complexity.

The apparatus for analyzing the evolutionary relationship of the malicious code may extract the number of API sequences by using the API sequence information which may be obtained by performing the dynamic analysis of the malicious code binaries. Also, the apparatus for analyzing the evolutionary relationship of the malicious code may extract the second degree of complexity by using the call graph information which may be obtained by performing the static analysis of the malicious code binaries.

The number of API sequences may be the number of APIs included in a sequence and the second degree of complexity may denote a degree of complexity of the call graph.

In operation 930, based on the number of extracted API sequences and the extracted second degree of complexity, the first degree of complexity of the malicious code binaries may be calculated.

The apparatus for analyzing the evolutionary relationship of the malicious code may calculate the first degree of complexity according to Equation 1 described above in FIG. 8.

$w_1$ and $w_2$ are arbitrary values and correspond to weight values, and may be heuristically defined by understanding characteristics of the malicious code binaries.

The malicious code binaries may be packed or anti-debugged. When the malicious code binaries are packed, a dynamic analysis may be more accurate than a static analysis, and thus, $w_1$ may be decreased and $w_2$ may be increased. However, when the malicious code binaries are anti-debugged, the static analysis may be more accurate than the dynamic analysis, and thus, $w_1$ may be increased and $w_2$ may be decreased. Also, when the malicious code binaries are not packed or are not anti-debugged, $w_1$ and $w_2$ may be the same.

Packing denotes a portion of a malicious code program which is compressed and becomes difficult to read and analyze, and anti-debugging is a software technique for preventing reverse engineering or debugging, which may be used to hinder detection and removal of a malicious code.

According to an embodiment, when the apparatus for analyzing the evolutionary relationship of the malicious code calculates the first degree of complexity of the malicious code binaries, in the case of a malicious code binary which is not packed and is not anti-debugged, $w_1=0.5$, $w_2=0.5$ in the case of a malicious code binary which is packed but is not anti-debugged, $w_1=0.1$, $w_2=0.9$, and in the case of a malicious code binary which is not packed but is anti-debugged, $w_1=0.9$, $w_2=0.1$ However, it is not limited thereto.

In operation 940, the apparatus for analyzing the evolutionary relationship of the malicious code may select a malicious code binary having the lowest first degree of complexity from among the malicious code binaries as a root binary ROOT.

Figure 10:
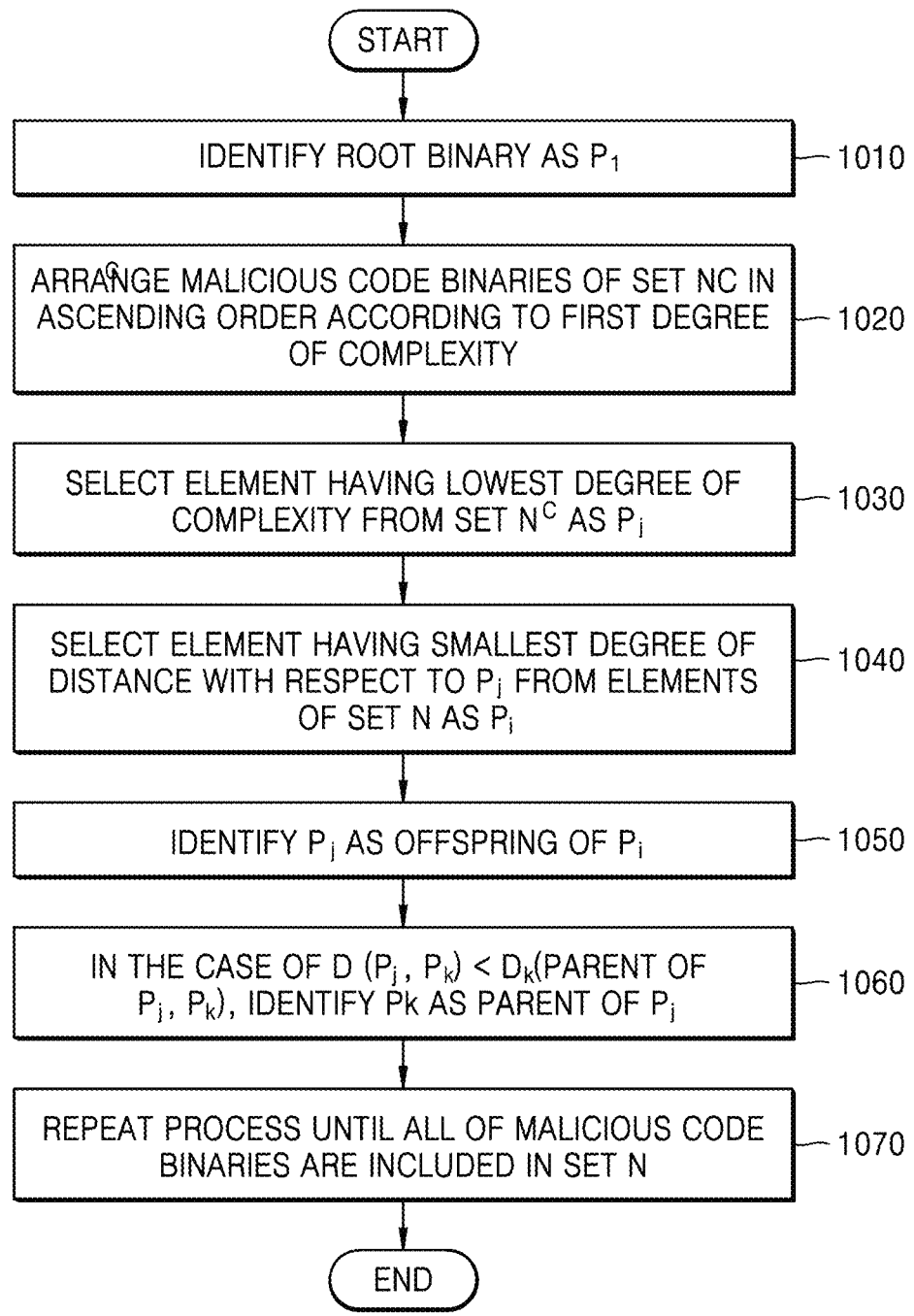
FIG. 10 is a detailed flowchart of operation S830 illustrated in FIG. 8.

FIG. 10 is a detailed flowchart of operation 830 illustrated in FIG. 8. FIG. 10 corresponds to operation 830 of FIG. 8, and thus, repeated descriptions will not be given.

Referring to FIG. 10, in operation 1010, the apparatus for analyzing the evolutionary relationship of the malicious code may identify the root binary as Pt. The apparatus for analyzing the evolutionary relationship of the malicious code may identify the root binary from among malicious code binaries classified into the same family as Pt.

The root binary may be the first malicious code binary which is initially generated, and the apparatus for analyzing the evolutionary relationship of the malicious code may select the root binary and may infer the evolutionary order of the malicious code binaries except for the root binary based on the root binary.

In operation 1020, the apparatus for analyzing the evolutionary relationship of the malicious code may arrange the malicious code binaries of a set $N^c$ in an ascending order according to the first degree of complexity. The apparatus for analyzing the evolutionary relationship of the malicious code may arrange the malicious code binaries of the set $N^c$ in a reverse order with respect to the first degree of complexity.

N denotes a set of malicious code binaries for which an evolutionary order is identified from among the plurality of malicious code binaries, and $N^c$ denotes a set of malicious code binaries for which an evolutionary order is not identified from among the plurality of malicious code binaries.

According to an embodiment, N and $N^c$ may be the sets included in the malicious code binaries classified into the same family. In operation 1030, the apparatus for analyzing the evolutionary relationship of the malicious code may select an element having the smallest degree of complexity from the set $N^c$ as $P_j$.

In operation 1040, the apparatus for analyzing the evolutionary relationship of the malicious code may select an element having the lowest degree of distance with respect to $P_j$ from among the elements of the N as $P_i$.

In detail, the apparatus for analyzing the evolutionary relationship of the malicious code may calculate and compare degrees of distance between all malicious code binaries included in the set N and $P_j$ included in the set $N^c$, and may select an element having the lowest degree of distance with respect to $P_j$ from among all the malicious code binaries included in the set N, as $P_i$.

In operation 1050, the apparatus for analyzing the evolutionary relationship of the malicious code may identify $P_j$ as an offspring of $P_i$.

A parent and an offspring are expressions to indicate an order or a hierarchical structure in an evolutionary relationship and related to the evolutionary relationship between the malicious code binaries. The malicious code binary having a precedent evolutionary order is referred to as a parent, and the malicious code binary having a following evolutionary order is referred to as an offspring.

The apparatus for analyzing the evolutionary relationship of the malicious code may identify $P_j$ as an offspring of $P_i$ and identify $P_i$ as a parent of $P_j$, and the evolutionary order of $P_i$ may precede the evolutionary order $P_j$.

In operation 1060, the apparatus for analyzing the evolutionary relationship of the malicious code may identify $P_k$ as a parent of $P_j$, in the case of $D(p_j, p_k) < D(\text{parent of } p_j, p_k)$.

In detail, the apparatus for analyzing the evolutionary relationship of the malicious code may calculate $D(p_j, p_k)$ and, $D(\text{parent of } p_j, p_k)$, and in the case of $D(p_j, p_k) < D(\text{parent of } p_j, p_k)$, may identify $P_k$ as the parent of $P_j$ and $P_i$ as an offspring of $P_k$. In the case of $D(p_j, p_k) > D$(parent of $p_j, p_k$), $P_k$ may not be identified as the parent of $P_j$.

According to an embodiment, during evolution, malicious code binaries may be branched to different branches or merged into one according to a certain principle. The apparatus for analyzing the evolutionary relationship of the malicious code may analyze the malicious code binaries, in a state in which the malicious code binaries are branched or merged. Thus, a parent and an offspring may not correspond to each other based on one-on-one correspondence, and for a certain offspring malicious code binary, there may be a plurality of parent malicious code binaries.

Referring to FIG. 10, in operation 1070, the apparatus for analyzing the evolutionary relationship of the malicious code may repeat the operations until all of the malicious code binaries are included in the set. N According to an embodiment, a root binary from among malicious code binaries that are classified into the same family is only one, and thus, operation 1010 may be excluded, and operations S1020 through S1070 may be repeated until an evolutionary order of all malicious code binaries of the set $N^c$, for which the evolutionary order is not identified, is identified, and then, the malicious code binaries are included in the set. N Through the process in which all of the malicious code binaries are included in the set, N the evolutionary order of the malicious code binaries may be inferred.

Also, the apparatus for analyzing the evolutionary relationship of the malicious code may derive a graph according to the evolutionary order of the malicious code binaries.

The graph may include a picture, a table, a chart, a diagram, etc. which may visually indicate the evolutionary order of the malicious code binaries, but the graph is not limited thereto.

The apparatus for analyzing the evolutionary relationship of the malicious code may derive the graph according to the evolutionary order after inferring the evolutionary order of the malicious coded binaries. Also, the apparatus for analyzing the evolutionary relationship of the malicious code may simultaneously derive the graph while inferring the evolutionary order of the malicious code binaries.

Figure 11:
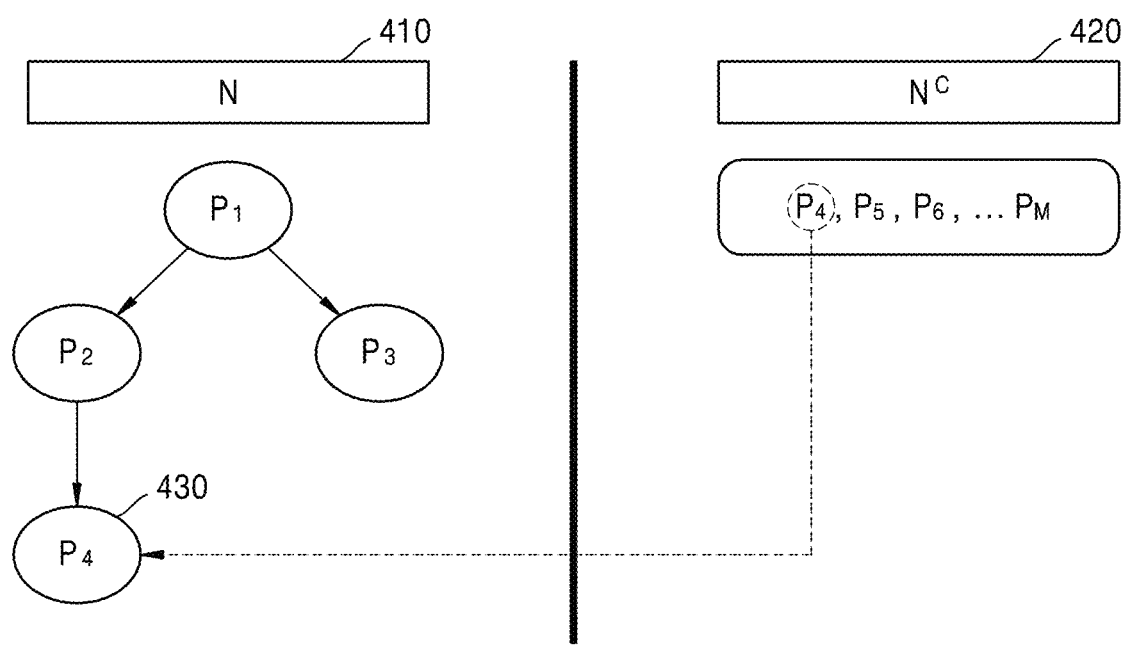
FIGS. 11 and 12 are views for describing an example in which an evolutionary order of malicious code binaries is inferred and a graph is derived based on the inferred evolutionary order, according to an embodiment.
Figure 12:
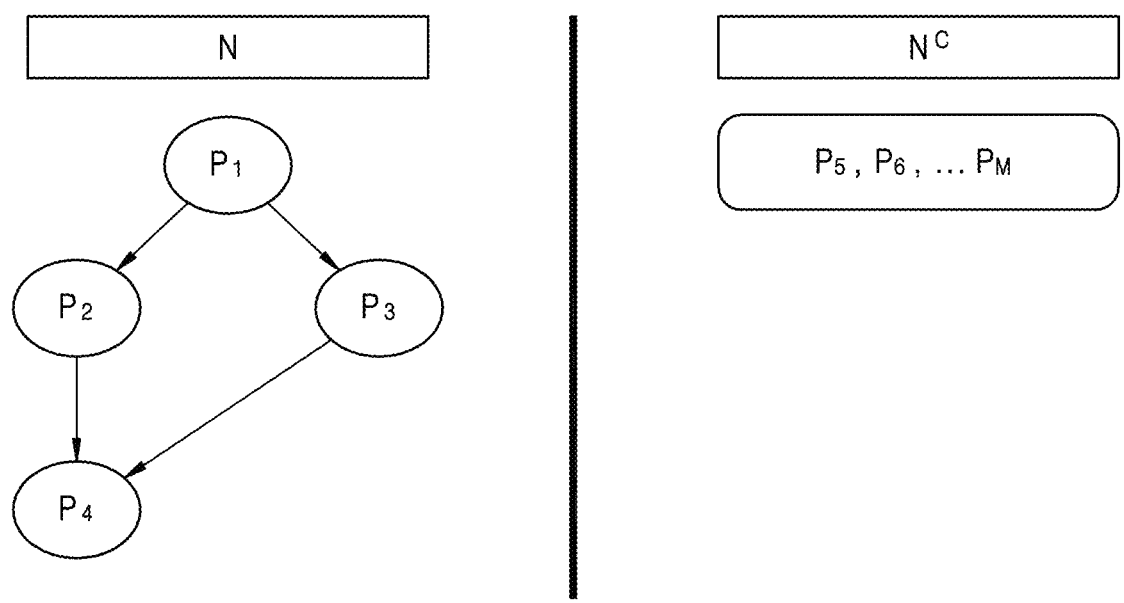

FIGS. 11 and 12 are views for describing an example in which an evolutionary order of malicious code binaries is inferred and a graph is derived based on the inferred evolutionary order, according to an embodiment.

Referring to FIG. 11, $P_1$, $P_2$, $P_3$, etc. may denote certain malicious code binaries and $P_M$ may denote that the number of malicious code binaries classified into the same family is M. N1110 denotes a set of malicious code binaries for which an evolutionary order is identified from among the plurality of malicious code binaries, and $N^c$ 1120 denotes a set of malicious code binaries for which an evolutionary order is not identified from among the plurality of malicious code binaries.

It may be assumed that $P_1$ is identified as a root binary and included in the set N 1110 and that a first degree of complexity is increased in the order of $P_1, P_2, P_3, P_4 \ldots P_M$.

According to an embodiment, the apparatus for analyzing the evolutionary relationship of the malicious code may identify $P_1$ and arrange the first degree of complexity in the ascending order $(P_2, P_3, P_4, \ldots P_M)$. Thereafter, the apparatus for analyzing the evolutionary relationship of the malicious code may select $P_2$, the malicious code binary having the lowest first degree of complexity, from the set $N^c$ 1120, and then, because only $P_1$ exists in the set N 1110, may identify $P_2$ as an offspring of $P_1$.

When the evolutionary order of $P_2$ and $P_1$ is identified, the apparatus for analyzing the evolutionary relationship of the malicious code may select $P_3$, the malicious code binary having the lowest first degree of complexity, from the set $N^c$ 1120, and then, because $P_1$ and $P_2$ exist in the set N 1110, may calculate $D(p_1, p_3)$ and a $D(p_2, p_3)$ nd by assuming that $D(p_1, p_3)$ has a smaller value than, $D(p_2, p_3)$ may identify $P_3$ as an offspring of $P_1$.

When the evolutionary order of $P_1$, $P_2$, and $P_3$ is identified, $P_4$, the malicious code binary having the lowest first degree of complexity in the set $N^c$ 1120 may be selected. Because $P_1$, $P_2$, and $P_3$ exist in the set N1110, $D(p_1, p_4)$, $D(p_2, p_4)$ and $D(p_3, p_4)$ may be calculated, and when, from among, $D(p_1, p_4)$, $D(p_2, p_4)$ and, $D(p_3, p_4)$ $D(p_2, p_4)$ has the least value, $P_4$ may be identified as an offspring of $P_2$.

The apparatus for analyzing the evolutionary relationship of the malicious code may derive a graph of the evolutionary order of the malicious code binaries. The graph may be shown as a directed acyclic graph having directionality, but is not limited thereto.

According to an embodiment, $P_1$, $P_2$, $P_3$, etc. may denote certain malicious code binaries and the malicious code binaries may be indicated as a circle. A parent and an offspring may be indicated by connecting an arrow.

For example, $P_1$, a root binary, may be indicated as a circle, the first degree of complexity may be arranged in an ascending order $(P_2, P_3, P_4, \ldots P_M)$, and $P_2$, a malicious code binary having the lowest first degree of complexity, may be selected from the set $N^c$ 420 and indicated as a circle. Because only $P_1$ exists in the set N1110, $P_2$ may be connected as an offspring of $P_i$ by using an arrow. Also, $P_3$ may be indicated as a circle, $D(p_1, p_3)$ and $D(p_2, p_3)$ may be calculated, and by assuming that $D(p_1, p_3)$ is less than $D(p_2, p_3)$, $P_3$ may be connected as an offspring of $P_1$ by using an arrow. Next, $P_4$ may be indicated as a circle, $D(p_1, p_4)$, $D(p_2, p_4)$ and $D(p_3, p_4)$ may be calculated, and by assuming that from among, $D(p_1, p_4) D(p_2, p_4)$, and, $D(p_3, p_4)$ $D(p_2, p_4)$ has the least value, the graph may be derived by connecting $P_4$ as an offspring of $P_2$ by using an arrow.

$P_4$ of the set $N^c$ 1120 and $P_4$ of the set N 1110 may be the same malicious code binary. Dotted lines connected to $P_4$ may be indicated to describe the processes in which $P_4$ is selected from the set $N^c$ 1120, the evolutionary order of $P_4$ is identified, and $P_4$ is included in the set N 1110. The dotted lines may be omitted when deriving the graph.

Referring to FIG. 12, $P_1$, $P_2$, $P_3$, etc. may denote certain malicious code binaries and $P_M$ may denote that the number of malicious code binaries classified into the same family is M. N may denote a set of malicious code binaries, the evolutionary order of which is identified, and $N^c$ may denote a set of malicious code binaries, the evolutionary order of which is not identified.

It may be assumed that $P_1$ is identified as a root binary and included in the set N and a first degree of complexity is increased in the order of $P_1, P_2, P_3, P_4 \ldots P_M$. FIG. 12 describes the disclosure following FIG. 11, and thus, the same description will not be given.

According to an embodiment, in the apparatus for analyzing the evolutionary relationship of the malicious code, when a relationship between $P_4$ and $P_3$ is less than a relationship between $P_2$ and $P_3$, a distance between $P_4$ and $P_3$ has to be greater than a distance between $P_2$ and $P_3$. However, when the distance between $P_4$ and $P_3$ becomes less than the distance between $P_2$ and $P_3$, it denotes that $P_4$ has a higher connection with respect to $P_3$, and $P_3$ may be identified as a parent of $P_4$.

For example, it will be assumed that $P_1$, $P_2$, $P_3$, and $P_4$ are identified as in FIG. 11. $P_3$ corresponds to a malicious code binary having no offspring in the set N and may correspond to $P_k$ of FIG. 10. $P_4$ corresponds to a malicious code binary identified as an offspring of $P_2$ and may correspond to $P_i$ of FIG. 10. $P_2$ corresponds to a malicious code binary identified as a parent of $P_4$ and may correspond to a parent of $P_j$ of FIG. 10. By calculating $D(p_3, p_4)$ and $D(p_2, p_3)$ and assuming that $D(p_3, p_4)$ is less than $D(p_2, p_3)$, $P_3$ may be identified as a parent of $P_4$.

The apparatus for analyzing the evolutionary relationship of the malicious code may derive a graph of the evolutionary order of the malicious code binaries.

For example, it will be assumed that $P_1$, $P_2$, $P_3$, and $P_4$ are indicated as a graph as in FIG. 11. The apparatus for analyzing the evolutionary relationship of the malicious code may calculate $D(p_3, p_4)$ and $D(p_2, p_3)$ and when the calculated $D(p_3, p_4)$ is less than $D(p_2, p_3)$, the graph may be derived by connecting $P_3$ as a parent of $P_4$ by using an arrow.

Figure 13:
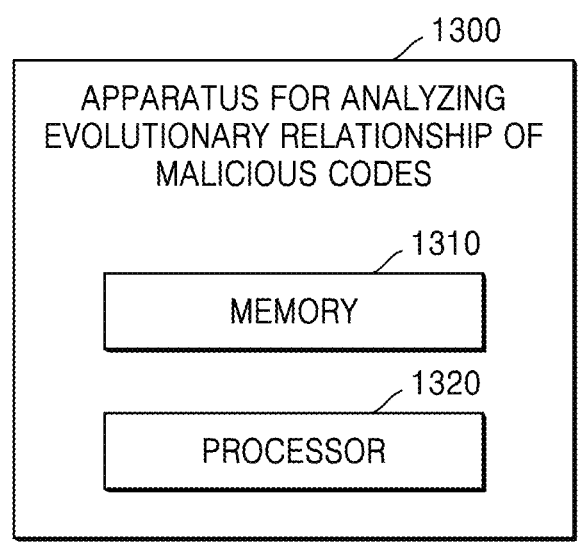
FIG. 13 is a block diagram of an apparatus for analyzing an evolutionary relationship of a malicious code, according to an embodiment.

FIG. 13 is a block diagram of an apparatus 1300 for analyzing an evolutionary relationship of a malicious code, according to an embodiment.

Referring to FIG. 13, the apparatus 1300 for analyzing the evolutionary relationship of the malicious code may include a memory 1310 and a processor 1320. The apparatus 1300 for analyzing the evolutionary relationship of the malicious code illustrated in FIG. 13 includes only components related to the embodiment. Thus, it will be understood by one of ordinary skill in the art that other general-purpose components in addition to the components illustrated in FIG. 13 may further be included in the apparatus 1300 for analyzing the evolutionary relationship of the malicious code.

The memory 1310 may be a hardware component storing various data to be processed in the apparatus 1300 for analyzing the evolutionary relationship of the malicious code. For example, the memory 1310 may store collected data and may include a malicious code collection DB, a second graph DB, a representative graph DB, a functional information DB, and a malicious action analysis result DB. Also, the memory 1310 may store a value generated by calculating a first degree of complexity of malicious code binaries and may store malicious code binaries classified into the same family, a value generated by calculating a degree of distance between the malicious code binaries, etc. The memory 1310 may include random access memory, such as dynamic random access memory (DRAM) and static random access memory (SRAM), read-only memory (ROM), such as electrically-erasable programmable read-only memory (EEPROM), CD-ROM, Blueray or other optical disk storages, a hard disk drive (HDD), a solid state drive (SSD), or a flash memory.

The processor 1320 may perform general functions for analyzing the malicious code, the process described above in detail with reference to FIGS. 1 through 12.

According to an embodiment, the processor 1320 may extract a source code of a malicious code from a malicious code file, and may parse or analyze the extracted source code to generate a first graph, a second graph, and a representative graph. The processor 1320 may compare the representative graph or an RADG with a second graph or a CFG of a malicious code which is to be analyzed, to determine a degree of similarity between the graphs, and may determine a function of the malicious code based on the determined degree of similarity. Also, the processor 1320 may calculate the first degree of complexity of each of the plurality of malicious code binaries. The processor 1320 may select a root binary, which is initially generated, by using the calculated first degrees of complexity. The processor 1320 may infer an evolutionary order of the plurality of malicious code binaries, except for the root binary, based on the calculated first degrees of complexity and degrees of distance between the plurality of malicious code binaries.

The processor 1320 of the apparatus 1300 for analyzing the evolutionary order of the malicious code may be formed in the form of at least one hardware chip and may be mounted in the apparatus 1300 for analyzing the evolutionary order of the malicious code.

According to the disclosure, a representative graph may be generated based on clustered second graphs, and a function of a malicious file may be analyzed by using the representative graph. Also, when there are a plurality of malicious codes, the first degree of complexity of the malicious code binaries may be calculated, and a root binary may be selected based on the first degree of complexity of the malicious code binaries. Also, an evolutionary order of the malicious code binaries may be inferred based on a degree of distance between the malicious code binaries and the first degree of complexity of the malicious code binaries, and a graph may be derived by inferring the evolutionary order of the malicious code binaries. Accordingly, new malicious codes may be accurately and quickly analyzed, the evolutionary order of the malicious code binaries may be effectively identified, and the evolutionary order of the malicious code binaries may be inferred and effectively provided to a user.

One or more of the described embodiments may also be implemented with a recording medium having recorded thereon a program, such as a program module to be executed in computers. Computer-readable media may be arbitrary media which may be accessed by computers and may include volatile and non-volatile media, and detachable and non-detachable media. Also, the computer-readable media may include computer storage media and communication media. The computer storage media include all of volatile and non-volatile media, and detachable and non-detachable media which are designed as methods or techniques to store information including computer-readable instructions, data structures, program modules, or other data. The communication media include transmission mechanisms or other data of modulated data signals, such as computer-readable instructions, data structures, and program modules. Also, the communication media include other information transmission media.

Also, in this specification, a "unit" may refer to a hardware component, such as a processor or a circuit, and/or a software component executed by a hardware component such as a processor.

While the disclosure has been particularly shown and described with reference to example embodiments thereof, it will be understood by one of ordinary skill in the art that various changes in form and details may be made therein without departing from the spirit and scope of the disclosure as defined by the following claims. Hence, it will be understood that the embodiments described above are examples in all aspects and are not limiting of the scope of the disclosure. For example, components each described as a single unit may be implemented in a distributed fashion. Likewise, components each described as a distributed form may be implemented in a combined fashion.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of generating a representative graph for analyzing a function of a malicious code, the method comprising:
obtaining a source code from a pre-stored malicious file;
generating, by analyzing the source code, a first graph in which each of nodes is formed of a portion of the source code;
analyzing a dependency relationship between parameters by analyzing the nodes of the first graph;
generating second graphs indicating the analyzed dependency relationship between the parameters;
clustering the second graphs based on a degree of similarity; and
generating the representative graphs representing functions of clusters of the clustered second graphs,
wherein
the representative graphs representing functions of each clusters are generated based on adding the second graphs existing in each of the clusters.

2. The method of claim 1, wherein
the first graph is a control flow graph (CFG), in which a basic block is formed by analyzing an abstract syntax tree, after the abstract syntax tree is generated by parsing the source code,
the parameters are application programming interface (API) parameters, and
the second graphs are API dependency graphs (ADGs) indicating a dependency relationship between the API parameters.

3. The method of claim 1, further comprising
storing the representative graphs and generating a database (DB).

4. The method of claim 1, wherein
the generating of the representative graphs comprises
generating the representative graphs by connecting only nodes having an appearance frequency exceeding a threshold value by adding each second graph.

5. The method of claim 1, wherein
the clustering of the second graphs comprises
using a K-means clustering method.

6. A method of analyzing a function of a malicious code, the method comprising:
obtaining a source code of a malicious file which is an object of analysis;
generating, by analyzing the source code, a first graph in which each of nodes is formed of a portion of the source code;
analyzing a dependency relationship between parameters by analyzing the nodes of the first graph;
generating second graphs indicating the analyzed dependency relationship between the parameters; and
analyzing the function of the malicious code by comparing a degree of similarity between each of pre-stored representative graphs and the generated second graphs,
wherein
the comparing of the degree of similarity comprises using a ratio of an intersection to a union of nodes of the generated second graphs and nodes of each of the pre-stored representative graphs, as an index for determination of the degree of similarity.

7. The method of claim 6, wherein
the first graph is a control flow graph (CFG), in which a basic block is formed by analyzing an abstract syntax tree, after the abstract syntax tree is generated by parsing the source code,
the parameters are application programming interface (API) parameters, and
the second graphs are API dependency graphs (ADGs) indicating a dependency relationship between the API parameters.

8. A method of analyzing an evolutionary relationship of a malicious code, the method comprising:
calculating a first degree of complexity of each of a plurality of malicious code binaries;
selecting a root binary that is initially generated, by using the calculated first degree of complexity; and
inferring an evolutionary order of the plurality of malicious code binaries, except for the root binary, based on the calculated first degree of complexity and a degree of distance between the plurality of malicious code binaries.

9. The method of claim 8, wherein
the selecting of the root binary comprises
selecting, as the root binary, a malicious code binary having a lowest first degree of complexity from among malicious code binaries classified into the same family from among the plurality of malicious code binaries.

10. The method of claim 8, wherein
the calculating of the first degree of complexity comprises
calculating the first degree of complexity by using a dynamic analysis and a static analysis, wherein
the dynamic analysis extracts the number of application programming interface (API) sequences called by each of the plurality of malicious code binaries, and
the static analysis extracts a second degree of complexity of each of the plurality of malicious code binaries, wherein the extracted second degree of complexity is determined as a sum of the number of nodes and the number of edges.

11. The method of claim 8, wherein
the first degree of complexity is calculated according to equation 1:

$$\text{First degree of complexity} = w_1 s + w_2 d \qquad \text{[Equation 1]}$$

(wherein $w_1$, $w_2$ are arbitrary values and correspond to weight values, s is a second degree of complexity, and d is the number of application programming interface (API) sequences.)

12. The method of claim 11, wherein,
when certain malicious code binaries are packed from among the plurality of malicious code binaries, $w_1$ is less than $w_2$,
when the certain malicious code binaries are anti-debugged, $w_2$ is less than $w_1$, and
when the certain malicious code binaries are not packed and are not anti-debugged, $w_1$ is the same as $w_2$.

13. The method of claim 8, wherein
the degree of distance
is calculated according to equation 2:

$$D(p_i, p_j) = 1 - \frac{|p_i \cap p_j|}{|p_i \cup p_j|} \qquad \text{[Equation 2]}$$

(wherein $p_i$ and $p_j$ each denotes a certain malicious code binary, $D(p_i, p_j)$ denotes the degree of distance between $p_i$ and $p_j$ and $$\frac{|p_i \cap p_j|}{|p_i \cup p_j|}$$

is a degree of similarity between $p_i$ and $p_j$).

14. The method of claim 13, wherein the degree of similarity is calculated by using the number of application programming interface (API) sequences.

15. The method of claim 13, wherein the degree of similarity is calculated by using at least one of a Needleman-Wunsch algorithm, a Smith-Waterman algorithm, and a Hirschberg's algorithm.

16. The method of claim 8, wherein the inferring of the evolutionary order comprises:
identifying the root binary as: $p_1$
when it is assumed that a set of malicious code binaries, for which the evolutionary order is identified, from among the plurality of malicious code binaries, is N and a set of malicious code binaries, for which the evolutionary order is not identified, from among the plurality of malicious code binaries, is $N^c$, arranging the malicious code binaries of $N^c$ in an ascending order according to the first degree of complexity;
selecting a malicious code binary having a lowest first degree of complexity from the set $N^c$ as: $p_j$
selecting a malicious code binary of the set, N the malicious code binary satisfying equation 3, as $p_i$:

$$\min\{D(p_j, p_i) : p_i \in N\} \qquad \text{[Equation 3]}$$

(wherein $p_i$ and $p_j$ each denotes a certain malicious code binary and $D(p_i, p_j)$ denotes the degree of distance between $p_i$ and $p_j$);
identifying the selected $p_j$, as an offspring of the selected $p_i$;
calculating $D(p_j, p_k)$ with respect to $p_k$ and the identified $p_j$ which are malicious code binaries having no offspring from the set N;
calculating D(a parent of $p_j$, $p_k$) with respect to the parent of $p_j$ and $p_k$;
identifying $p_k$ as the parent of $p_j$, when $D(p_j, p_k)$ is less than D(the parent of $p_j$, $p_k$); and
identifying the evolutionary order by repeating the operations in the inferring of the evolutionary order, until all of the plurality of malicious code binaries are included in the set N.

17. The method of claim 16, wherein the inferring of the evolutionary order further comprises deriving a graph according to the identified evolutionary order.

18. An apparatus for generating representative graphs for analyzing a function of a malicious code, the apparatus comprising:
a memory storing one or more instructions; and
one or more processors configured to execute the one or more instructions stored in the memory to:
obtain a source code from a pre-stored malicious file;
generate, by analyzing the source code, a first graph in which each of nodes is formed of a portion of the source code;
analyze a dependency relationship between parameters by analyzing the nodes of the first graph;
generate second graphs indicating the analyzed dependency relationship between the parameters;
cluster the second graphs based on a degree of similarity; and
generate the representative graphs representing functions of each of clusters of the clustered second graphs,
wherein
the representative graphs representing functions of each clusters are generated based on adding the second graphs existing in each of the clusters.

19. The apparatus of claim 18, wherein
the first graph is a control flow graph (CFG), in which a basic block is formed by analyzing an abstract syntax tree, after the abstract syntax tree is generated by parsing the source code,
the parameters are application programming interface (API) parameters, and
the second graphs are API dependency graphs (ADGs) indicating a dependency relationship between the API parameters.

20. The apparatus of claim 18, wherein
the representative graph is stored and a database (DB) is generated.

21. The apparatus of claim 18, wherein
the representative graphs are generated by connecting only nodes having an appearance frequency exceeding a threshold value by adding each second graph.

22. The apparatus of claim 18, wherein
the second graphs are clustered by using a K-means clustering method.

23. An apparatus for analyzing a function of a malicious code, the apparatus comprising:
a memory storing one or more instructions; and
one or more processors configured to execute the one or more instructions stored in the memory to:
obtain a source code of a malicious file which is an object of analysis;
generate, by analyzing the source code, a first graph in which each of nodes is formed of a portion of the source code;
analyze a dependency relationship between parameters by analyzing the nodes of the first graph;
generate second graphs indicating the analyzed dependency relationship between the parameters; and
analyze the function of the malicious code by comparing a degree of similarity between each of pre-stored representative graphs and the generated second graphs,
wherein
the degree of similarity is compared by using a ratio of an intersection to a union of nodes of the generated second graphs and nodes of each of the pre-stored representative graphs, as an index for determination of the degree of similarity.

24. The apparatus of claim 23, wherein
the first graph is a control flow graph (CFG), in which a basic block is formed by analyzing an abstract syntax tree, after the abstract syntax tree is generated by parsing the source code,
the parameters are application programming interface (API) parameters, and
the second graphs are API dependency graphs (ADGs) indicating a dependency relationship between the API parameters.

25. An apparatus for analyzing an evolutionary relationship of a malicious code, the apparatus comprising:
a memory storing one or more instructions; and
one or more processors configured to execute the one or more instructions stored in the memory to:
calculate a first degree of complexity of each of a plurality of malicious code binaries;

select a root binary that is initially generated, by using the calculated first degree of complexity; and infer an evolutionary order of the plurality of malicious code binaries, except for the root binary, based on the calculated first degree of complexity and a degree of distance between the plurality of malicious code binaries.

26. A recording medium having recorded thereon a program for executing the method of claim 1 on a computer.

* * * * *